United States Patent
Crinon et al.

(10) Patent No.: US 9,801,076 B2
(45) Date of Patent: *Oct. 24, 2017

(54) URBAN MOBILE NETWORK SYSTEM

(71) Applicant: Beelinx USA, LLC, Dallas, TX (US)

(72) Inventors: Guillaume Crinon, Douvres-la-Délivrande (FR); Nicolas Constantinidis, Cresserons (FR); Didier Gallais, Bieville-Beuville (FR)

(73) Assignee: BEELINX USA, LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/195,414

(22) Filed: Jun. 28, 2016

(65) Prior Publication Data

US 2017/0034712 A1 Feb. 2, 2017

Related U.S. Application Data

(63) Continuation of application No. 14/734,869, filed on Jun. 9, 2015, now Pat. No. 9,380,113, which is a (Continued)

(51) Int. Cl.
| | |
|---|---|
| *H04B 5/00* | (2006.01) |
| *H04W 16/24* | (2009.01) |
| *G06Q 30/02* | (2012.01) |
| *H04L 12/18* | (2006.01) |

(Continued)

(52) U.S. Cl.
CPC ............ *H04W 16/24* (2013.01); *G06Q 30/02* (2013.01); *H04L 12/18* (2013.01); *H04L 51/20* (2013.01);
(Continued)

(58) Field of Classification Search
USPC ............. 455/41.1–41.3, 550.1, 456.1–456.3
See application file for complete search history.

(56) References Cited

U.S. PATENT DOCUMENTS

| | | | |
|---|---|---|---|
| 8,355,862 B2* | 1/2013 | Matas | G01C 21/3614 345/441 |
| 2002/0095333 A1 | 7/2002 | Jokinen | |

(Continued)

FOREIGN PATENT DOCUMENTS

| | | |
|---|---|---|
| WO | 0186428 A2 | 11/2001 |
| WO | 2007070244 A2 | 6/2007 |
| WO | 2010008409 A1 | 1/2010 |

OTHER PUBLICATIONS

PCT: International Search Report and Written Opinion of PCT/IB2010/002897; Apr. 7, 2011; 13 pages.
(Continued)

*Primary Examiner* — Fayyaz Alam
(74) *Attorney, Agent, or Firm* — Munck Wilson Mandala LLP

(57) ABSTRACT

An embodiment of a mobile communication system includes a plurality of mobile units operating within a defined operating area, each of the mobile units having a processor, a memory for storing a mobile unit file structure, an application running on the processor for operating on the mobile unit file structure, and a receiver for receiving on a common receive communication channel data. The mobile communication system further includes a plurality of geolocation markers disposed within the defined operating area, each having a memory for storing geolocation information to define a relative position within the defined operating area, and a geolocation transmitter for transmitting the defined geolocation information on the common receive communication channel, the geolocation transmitter having a geolocation transmit range less than the defined operating area.

14 Claims, 14 Drawing Sheets

Related U.S. Application Data continuation of application No. 13/502,040, filed as application No. PCT/IB2010/002897 on Oct. 20, 2010, now Pat. No. 9,054,899.

(60) Provisional application No. 61/253,473, filed on Oct. 20, 2009.

(51) Int. Cl.
  *H04L 12/58* (2006.01)
  *H04W 4/02* (2009.01)
  *H04W 4/06* (2009.01)
  *H04W 4/20* (2009.01)
  *H04L 29/08* (2006.01)
  *H04W 40/22* (2009.01)

(52) U.S. Cl.
  CPC ......... *H04L 67/1095* (2013.01); *H04W 4/021* (2013.01); *H04W 4/06* (2013.01); *H04W 4/20* (2013.01); *H04W 40/22* (2013.01)

(56) References Cited

U.S. PATENT DOCUMENTS

| | | | |
|---|---|---|---|
| 2007/0136132 A1* | 6/2007 | Weiser | G06Q 30/02 705/14.64 |
| 2007/0287473 A1 | 12/2007 | Dupray | |
| 2009/0186628 A1* | 7/2009 | Yonker | G01C 21/26 455/456.1 |
| 2010/0145947 A1* | 6/2010 | Kolman | G06F 17/3087 707/736 |
| 2011/0306328 A1* | 12/2011 | Yonker | G01C 21/26 455/415 |

OTHER PUBLICATIONS

PCT: International Preliminary Report on Patentability of PCT/IB2010/002897; Apr. 24, 2012; 8 pages.

* cited by examiner

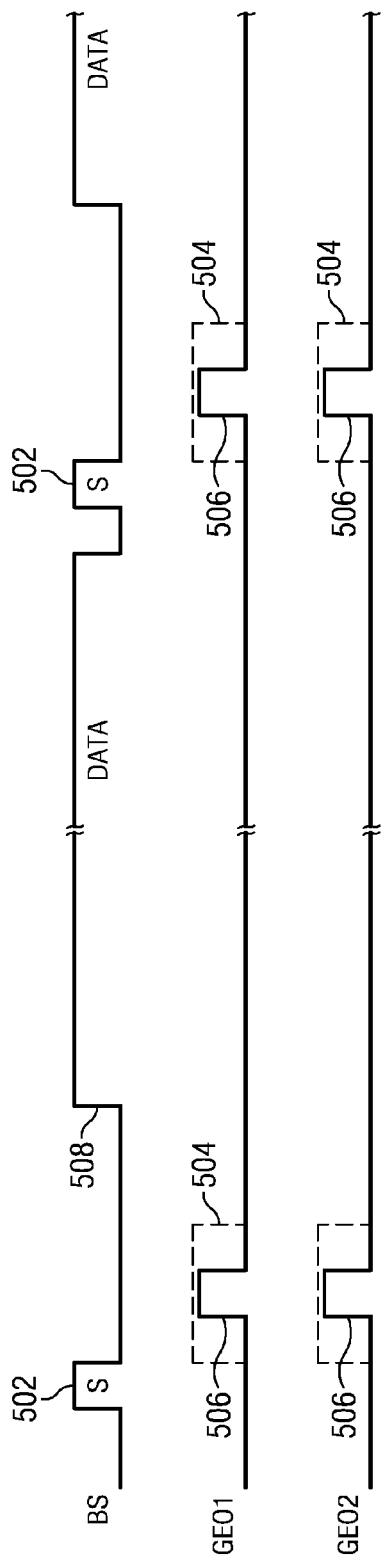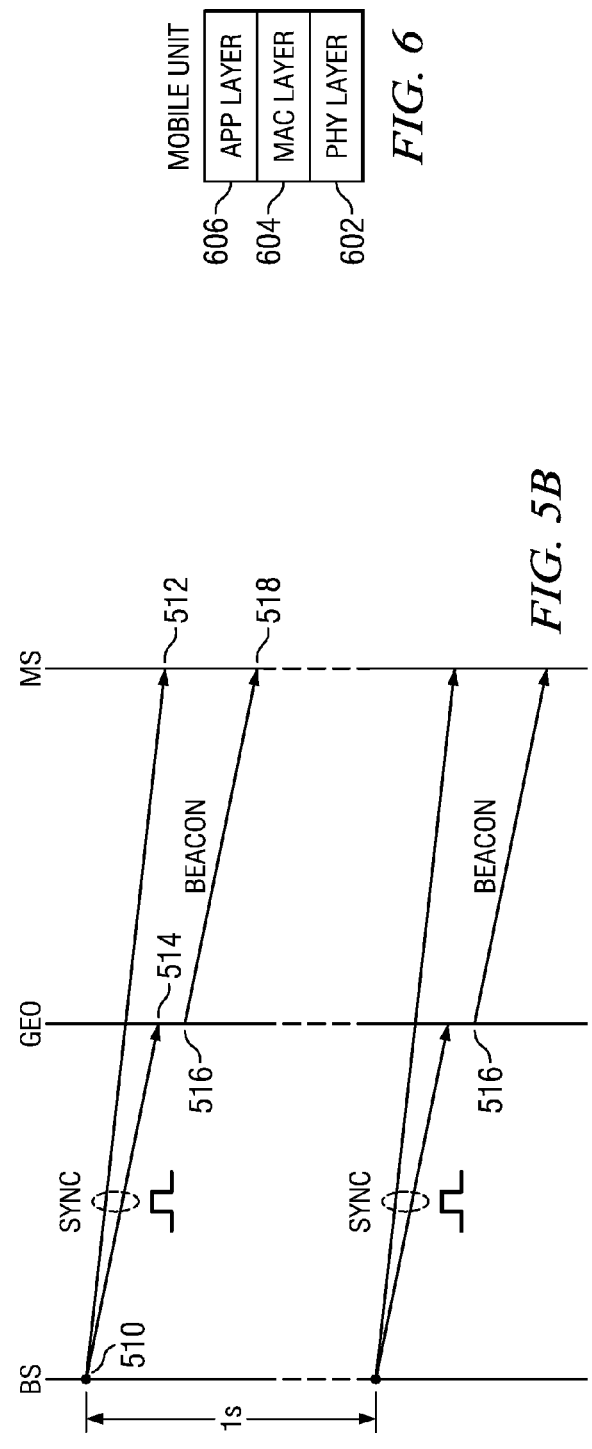
FIG. 5A
FIG. 5B
FIG. 6

TAB TITLE (LEVEL 0)

| TYPE | PAGE | VERSION | LEVEL/ NUMBER | SAR | TITLE | OPTION |
|------|------|---------|---------------|-----|-------|--------|

*FIG. 18*

WEB LINK (LEVEL 2)

| TYPE | PAGE | VERSION | LEVEL/ NUMBER | SAR | STRING |
|------|------|---------|---------------|-----|--------|

*FIG. 19*

MESSAGE (LEVEL 0)

| TYPE | PAGE | VERSION | LEVEL/ NUMBER | SAR | STRING 1 | STRING 2 | STRING 3 | STRING 4 |
|------|------|---------|---------------|-----|----------|----------|----------|----------|

HEADER

*FIG. 20*

| HEADER | STRING 1 |
|--------|----------|

*FIG. 20A*

| HEADER | STRING 1 | STRING 2 |
|--------|----------|----------|

*FIG. 20B*

| HEADER | STRING 2 |
|--------|----------|

*FIG. 20C*

| HEADER | STRING 2 | STRING 3 | STRING 4 |
|--------|----------|----------|----------|

*FIG. 20D*

DETAILED INFO (LEVEL 1)

| HEADER | STRING |
|--------|--------|

*FIG. 21*

| TYPE (SYNC) | GEO LOC C+1 | KEY VERSION | NAME | NETWORK ID | MINIMUM VERSION |
|---|---|---|---|---|---|

*FIG. 22*

| TYPE | LAT | LONG | NAME |
|---|---|---|---|

| MLB | NFL | NBA | NHL | D |
|---|---|---|---|---|
| HOME | AWAY | INNING | X X | |
| TEX 2 | SEA 4 | FINAL | X X | ... |
| NY 1 | BAL 10 | FINAL | X X | ... |
| PHL 10 | HOU 11 | 3rd | X X | |
| ⋮ | ⋮ | ⋮ | ⋮ | |

2408 — BOX SCORES
2410 — WEB LINK

*FIG. 24*

| HEADER | Nb ROWS | Nb COL | TITLE | OPTIONS |
|---|---|---|---|---|

*FIG. 24A*

| HEADER | STRING C1 | STRING C2 | STRING C3 |
|---|---|---|---|

| AMC | CINE | ATC | D |
|---|---|---|---|
| MOVIE | TIME | LENGTH | RATING |
| XXX | 7:30 | 1H 45M | G |
| XXX | 6:45 | 2H 20M | R |

2506 — DETAILS
WEB LINK

*FIG. 25*

| ATTRACTION | STATUS | DELAY | SCHEDULED | PERSONS | GROUP # | SELECT |
|---|---|---|---|---|---|---|
| A1 | ACTIVE | 20 MIN | 10 MIN | 4 | 15 | ☒ |
| A2 | INACTIVE | N/A | NS | | | ☐ |
| A3 | ACTIVE | 40 MIN | 2H 10M | 4 | 5 | ☒ |
| A4 | ACTIVE | 30 MIN | NS | | | ☐ |

P1 | TYPE | VERSION | SAR | ATTRACTION # | A1 | A2

P2 | TYPE | VERSION | SAR | ATTRACTION # | A2 | A3

Pm | TYPE | VERSION | SAR | ATTRACTION # | An-1 | An

| TYPE | ID | VERSION | STATUS | WAIT TIME |

| TYPE | ID | DEMAND TYPE | # | PERS ID |

| TYPE | ID | GROUP # | SCHEDULED TIME | # | PERS ID |
*FIG. 32*
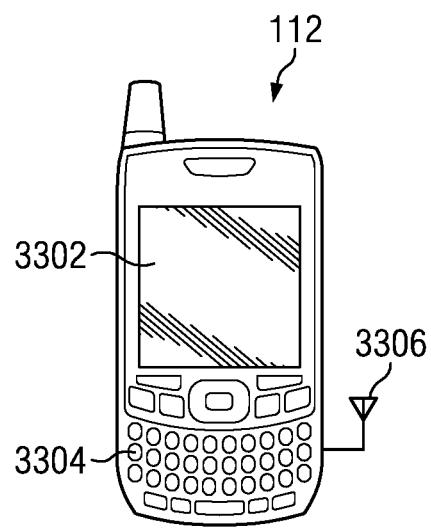
*FIG. 33*
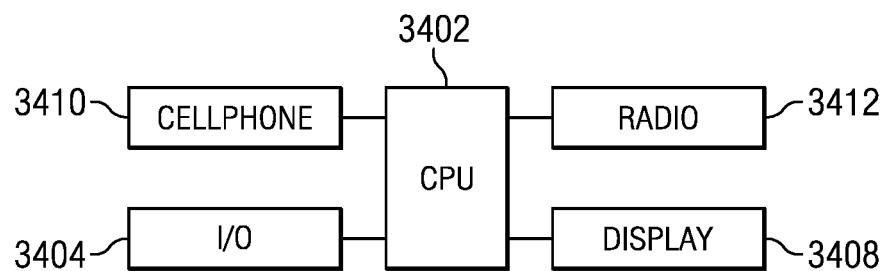
*FIG. 34*

URBAN MOBILE NETWORK SYSTEM

CROSS-REFERENCE TO RELATED APPLICATIONS

This application is a continuation of U.S. patent application Ser. No. 14/734,869, filed Jun. 9, 2015, entitled URBAN MOBILE NETWORK SYSTEM, now U.S. Pat. No. 9,380,113, issued on Jun. 28, 2016, which is a continuation of U.S. patent application Ser. No. 13/502,040, filed Apr. 13, 2012, entitled URBAN MOBILE NETWORK SYSTEM, now U.S. Pat. No. 9,054,899, issued Jun. 9, 2015, which is a 35 U.S.C. §371 National Phase Application of PCT/IB2010/02897, filed Oct. 20, 2010, entitled URBAN MOBILE NETWORK SYSTEM, which claims benefit of U.S. Provisional Application No. 61/253,473, filed Oct. 20, 2009, entitled ENABLER OF LOCATION-BASED SERVICES AND ADVERTISING, the specifications of which are incorporated by reference herein in their entirety.

TECHNICAL FIELD

The present invention pertains in general to mobile network systems and, more particularly, to a mobile network system that utilizes a broadcast mode for transmission of information to a plurality of mobile units.

BACKGROUND

In recent years, the desire for constant interaction with other individuals has seen a rapid increase. This is due, in large part, to the ever increasing bandwidth of mobile portable data assistances (PDAs) that allow a user to readily access multiple data networks. Some PDAs are able to interface with the data network of their cell phone provider and also with WiFi networks that utilize 802.11.xx communication protocols. Initially, the use of these data networks allowed users to access their email accounts which has become a very popular way to communicate. Also, text messaging has become very popular and, in some countries, has even exceeded phone conversations in use for various reasons. This phenomenon was then followed by the current use of cell phone applications that allow users to interface with their PDA in very user friendly manners. With such apps, social networking has evolved such that users of a PDA can interface with individuals in their immediate and extended social networks. As more and more people enter into these social networks, the demand for cell phones and bandwidth has increased.

One of the disadvantages to most social networks is that they operate on a TCP/IP protocol that requires a bidirectional communication path wherein the user's cell phone must request data when desired and, even if it operates in a mode where it automatically receives data, there is still some type of bidirectional communication path. Thus, when the PDA enters into a particular cell site or cell network, it must register with the network and, after registration, if data is to be "pushed" to that cell phone, the phone must be contacted, a link opened, and then data communication allowed between some central unit and the cell phone to transfer data thereto. All of this requires a great deal of bandwidth. Further, a large number of the applications require "off site" processing such that the data communication path is required in order for the user to even use the application effectively. Some reasons for this are that the amount of data required to be stored on the phone is too large or that some processing is required in association with the operation of the application, which processing is better performed off the phone for power reasons, since any processing that is performed in the phone consumes power.

SUMMARY

The present invention disclosed and claimed herein, in one aspect thereof, comprises a mobile network system that includes a central unit having a database having stored therein a data structure, and a central unit communications transceiver for communicating with a first network. The mobile network system further includes at least one intermediate base station having a base station transceiver for communication with the central unit over the first network, and a mobile transmitter for transmitting data to a second network. The mobile network system still further includes a plurality of mobile units, each having a mobile receiver for receiving data from the base station over the second network, and a memory for storing the data. The central unit operates in a broadcast mode to map at least one portion of the data structure to the memory in the mobile unit through the intermediate base station such that the portion of the data structure is received by substantially all of the mobile units at the same time.

Another embodiment of a mobile network system includes a central unit having a database having stored therein a data structure, and a central unit communications transceiver for communicating with a first network. The mobile network system further includes at least one intermediate base station having a base station transceiver for communication with the central unit over the first network, and a mobile transmitter for transmitting data to a second network. The mobile network system further includes at least one mobile unit having a mobile receiver for receiving data from the base station over the second network, a memory for storing the data, a display, and a processor for running an application to display at least a portion of the stored data. The mobile network system still further includes at least one geolocation marker external to the mobile unit for generating a signal including position information indicating a relative position, wherein the signal is received by the mobile unit when the mobile unit is proximate to the base station. The central unit operates in a broadcast mode to map at least one portion of the data structure to the memory in the mobile unit through the intermediate base station. The application running on the processor is operable to display a portion of the stored data associated with the relative position.

An embodiment of a method for communicating information in a mobile network includes storing a data structure in a database of a central unit, transmitting, by the central unit operating in a broadcast mode, at least a portion of the data structure to at least one intermediate base station via a first network, and receiving the at least a portion of the data structure by the at least one intermediate base station. The method further includes transmitting, by the at least one intermediate base station, the at least a portion of the data structure to a plurality of mobile units via second network, receiving the at least a portion of the data structure by each of the plurality of mobile units such that the portion of the data structure is received by substantially all of the mobile units at the same time, and mapping at least one portion of the data structure to a memory in each of the plurality of mobile units.

An embodiment of an urban mobile communication system includes a plurality of mobile units operating within a defined operating area, each of the mobile units having a processor, a memory for storing a mobile unit file structure, an application running on the processor for operating on the mobile unit file structure, and a receiver for receiving on a common receive communication channel data. The urban mobile communication system further includes a plurality of geolocation markers disposed within the defined operating area, each having a memory for storing geolocation information to define a relative position within the defined operating area, and a geolocation transmitter for transmitting the defined geolocation information on the common receive communication channel, the geolocation transmitter having a geolocation transmit range less than the defined operating area.

An embodiment of a method for communication information in an urban mobile communication system includes providing a plurality of mobile units operating within a defined operating area, each of the mobile units having a processor, and a memory for storing a mobile unit file structure, running an application on the processor of each of the plurality of mobile units for operating on the mobile unit file structure, and receiving, by each of the plurality of mobile units, data on a common receive communication channel. The method further includes providing a plurality of geolocation markers disposed within the defined operating area, each having a memory for storing geolocation information to define a relative position within the defined operating area and a geolocation transmitter, and transmitting, by the geolocation transmitter of each of the plurality of geolocation markers, the defined geolocation information on the common receive communication channel, the geolocation transmitter having a geolocation transmit range less than the defined operating area.

BRIEF DESCRIPTION OF THE DRAWINGS

For a more complete understanding, reference is now made to the following description taken in conjunction with the accompanying drawings in which:

FIGS. 5a and 5b illustrate the communication timing for the default channel and for the beacon operation;

FIG. 6 illustrates a block diagram of the various PHY, MAC and application layers of the mobile unit;

FIG. 18 illustrates a diagrammatic view of the message format for level 0;

FIG. 19 illustrates level 2 for the web link of the message format;

FIG. 20 illustrates level 1 for the message format;

FIGS. 20a-20d illustrate a multi-packet transmission utilizing segmentation;

FIG. 21 illustrates the message format for level 1 associated with the detailed information packet;

FIG. 22 illustrates the packet format for the sync packets;

FIG. 23 illustrates the packet format for the beacon packets;

FIG. 24 illustrates a diagrammatic view of an application utilizing an array of information;

FIGS. 24a and 24b illustrate the packet format for accommodating the array application;

FIG. 25 illustrates an alternate embodiment of the array of FIG. 24;

FIG. 32 illustrates the packet format for the response packet from the central unit to the mobile unit request;

FIG. 33 illustrates a diagrammatic view of the mobile unit; and

FIG. 34 illustrates a block diagram of the mobile unit.

DETAILED DESCRIPTION

Figure 1:
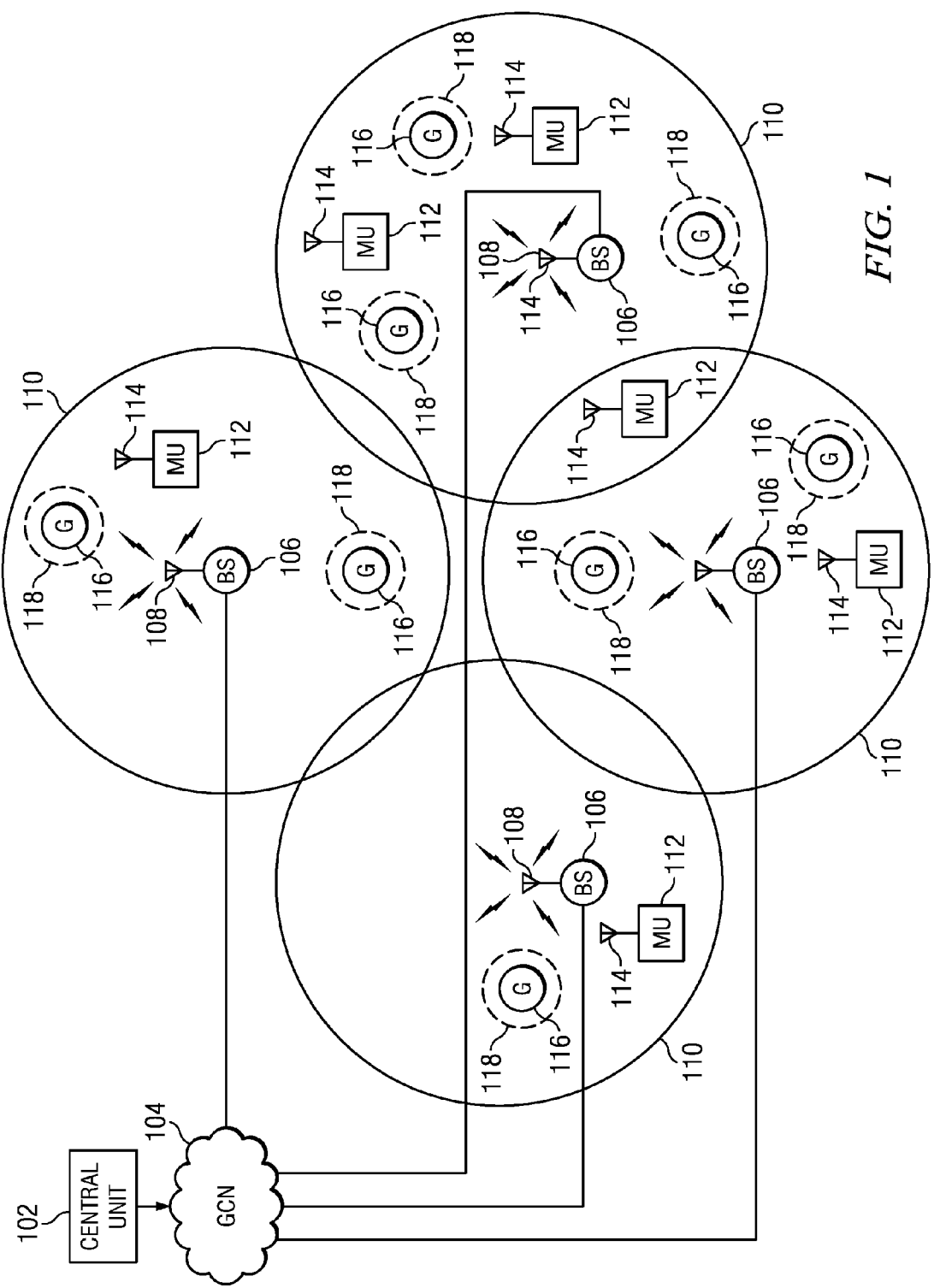
FIG. 1 illustrates an overall diagrammatic view of the mobile urban network system.

Referring now to the drawings, wherein like reference numbers are used herein to designate like elements throughout, the various views and embodiments of an urban mobile network system are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to FIG. 1, there is illustrated a diagrammatic view of the urban mobile communications system. At the heart of the system is a central unit 102. The central unit 102 is operable to store thereat a data structure which is comprised of a plurality of data files. These data files are transmitted to a Global Communication Network (GCN) 104 which is typically referred to as the internet. The central unit 102 connects through the GCN 104 to a plurality of base stations 106 via direct connections thereto. The base stations 106 each include an RF transmitter and an associated antenna 108. Each base station 106 is operable to transmit a signal within a coverage range 110. The range 110 is defined by the minimum power level that can be received by a compatible receiver within the receive range 110. This is typically at a level of approximately −102 dBm. The transmission protocol utilized in the exemplary embodiment is a modification of the 802.15.4 protocol as will be further described herein. This essentially defines the range of the transmitter as parameterized by the power level, the atmosphere and other external objects in the transmission range 110. However, the range 110 is defined by such things as the surrounding environment and the power levels of the transmitter. The plurality of base stations 106 are disposed such that they can possibly overlap and provide coverage for a particular area set forth by the designer of a system. This is a function of deleting "holes" in the coverage area such that a receiver can move around within the network and be in as continuous a connection with base stations 106 as possible. There can be multiple base stations 106 in a particular area that are defined as being on a single network ID. This will be described in more detail herein below. Thus, there is "substantially" continuous coverage accounting for the various holes or dead spots that normally occur in a coverage area.

The central unit 102 is operable to transmit data to each of the base stations 106 for storage thereof and relay therefrom to mobile units 112 that are disposed within the associated transmission or coverage range 110 for a given base station 106. Each of the mobile units (MU) 112 has an antenna 114 associated therewith. The mobile units 112 each have at least a receiver therein for receiving the signal from the base station 106 and the associated data. Each of the mobile units 112 also has associated therewith a processor for processing the data and for running an application thereon, and a display for displaying information to the user associated with the operation of the application. In various embodiments, a mobile unit 112 may be a mobile telephone, a smart phone, a PDA, a portable scanner (such as for application in a supermarket) or any other suitable mobile device or mobile unit. The base stations 106 and the mobile units 112 each operate on a modified 802.15.4 protocol which allows for multiple channels. There are 15 channels provided in the exemplary embodiment. Some of these channels can be set up for transmission operations and some for receive operations.

In the general operation, the central unit 102 is operable to "broadcast" a data structure that is disposed thereat to the base station 106 for the purpose of relaying this data structure to each of the mobile units 112 disposed within their associated transmission range 110. This is a transmit only function such that the data is pseudo continuously transmitted to all of the base stations. What is meant by pseudo continuous is that the data structure from the central unit 102 is transmitted to the base stations 106 and this data is then, on a regular basis, output from the transmitter to whatever mobile units 112 that are listening. Once a mobile unit 112 has received the data structure, it will ignore additional retransmissions of that same data. The base station 106 retransmits the data on as continuous a basis as possible depending upon whether other information needs to be transmitted, as will be described herein below. In any event, it is a circular type buffer wherein the data structure is completely transmitted and, thereafter, the data structure is placed in the queue again for retransmission.

When a new mobile unit 112 comes into the network, i.e., enters the network from somewhere else or turns on within the network, it will immediately recognize that it is within the network and that a transmission has been received from the base station 106. A signal from the base station will be detected containing at least a network ID which defines an application that is necessary to interface with the central unit through the base station 106 and, if the application is resident on the mobile unit 112, the application will be launched to receive the data, process the data and display it in accordance with the application that was launched. This all occurs without the necessity for the mobile unit 112 to send any information to the base station 106. As such, when a packet of data is transmitted out of the base station 106, it is transmitted to all mobile units within its transmission range 110. By continuously retransmitting the data, the mobile unit 112 can be ensured of being "up to date" on the various information transferred from the data structure of the central unit 102, through the base station 106 and subsequently to the mobile unit 112. All of the data reception is synchronized to the base station transmission via a sync signal transmitted by the base station 106.

In addition to the base station 106 being within a defined range 110 (actually defined by the transmission properties of the base station 106), there are also provided a plurality of geolocation markers 116 disposed within the defined transmission range. There can be up to 12 or more geolocation marker 116 associated with each base station 106. The geolocation marker 116 is a transmitter that operates on the same protocol as the base station 106. However, it typically is a transmitter that transmits a beacon, which beacon includes information as to position. This position can be a relative position that can be defined by a position ID or a node ID which, when received by a mobile unit 112, can be identified by the application as being at a certain position. In a particular embodiment, the position information may include latitude and longitude coordinates. In still another embodiment, the position information may include a location name associated with the geolocation marker 116. This is a predefined position. In an exemplary embodiment, the geolocation marker 116 receives the position information in an update message from the base station 106 prior to the geolocation marker 116 transmitting the beacon message. In a particular embodiment, the base station 106 sends the update message containing the position information to the geolocation marker 116 at a predetermined time after sending a synchronization packet. In another embodiment, the base station 106 sends the update message containing the position information to the geolocation marker 116 at a predetermined time after receiving a "lost message" from the geolocation marker 116, the "lost message" indicating that a predetermined time has passed since the geolocation marker 116 has received a synchronization message from the base station 106. Alternatively, as part of the another embodiment, the geolocation marker 116 may have a GPS unit associated therewith that can determine its longitude and latitude, i.e., it can determine its exact coordinate position within a coordinate grid. In another embodiment, the geolocation marker 116 may be preconfigured with the position information.

In at least one embodiment, the geolocation markers 116 are battery operated devices, but could be line powered in other embodiments. The geolocation markers 116 operate in synchronization with the operation of the base station 106 to transmit out on a single channel the longitude and latitude information. In a particular embodiment, the geolocation markers 116 further include a solar panel to charge the battery during day time operation. They have a defined transmission range 118 that is much smaller than the transmission range of the base stations 106. This is facilitated through power control of the geolocation marker 116. As will be described herein below, the geolocation marker 116 can have the power thereof increased such that it can talk to the base station 106. This is for the purpose of providing status information to the base station 106. However, in the normal mode of operation, the range 118 is much smaller than the range 110. The reason for this is that the mobile unit 112 only processes the information from a geolocation marker 116 when the mobile unit 112 enters into the range 118. Thus, the mobile unit 112 can roam around the range 110 and, only when it comes within the range 118 will it receive information as to position. It will utilize this position information in conjunction with the application residing on the mobile unit 112 to either augment the information that is being displayed or to alter the information that is being displayed. For example, if a map is being displayed, passing within the region 118 will place some type of indicator stating "you are here" on the map. Alternatively, when the mobile unit 112 passes by a geolocation marker within the range 118, an advertisement could be displayed on the mobile unit 112 display.

Figure 2:
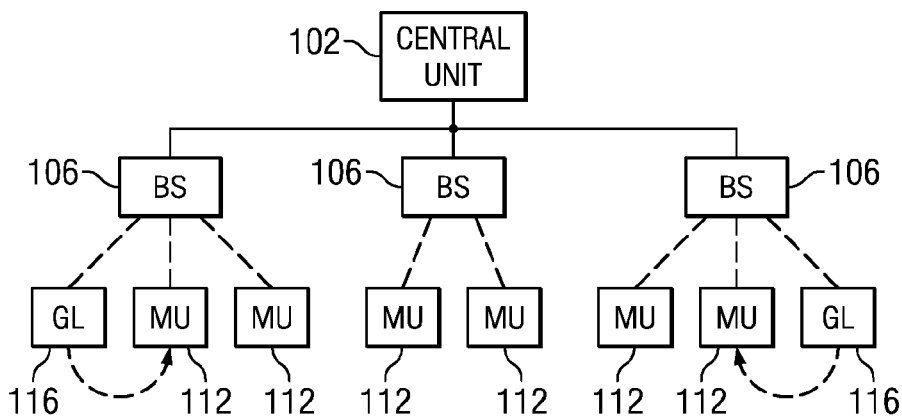
FIG. 2 illustrates a more detailed diagram of the mobile urban network system.

Referring now to FIG. 2, there is illustrated a diagrammatic view of a simplified operation of the system. In this operation, the central unit 102 is illustrated as communicating with a plurality of the base stations 106. They, in turn, are connected to associated ones of the mobile units 112 and the geolocation markers 116. It can be seen that the central unit 102 utilizes the base stations 106 merely as a relay to the mobile units 112. In essence, the central unit 102 has a virtual broadcast connection to each of the mobile units 112. Each of the mobile units 112 are disposed on a common level with respect to the central unit 102, i.e., if data is transmitted to one, it is transmitted to all. This transmission is such that a packet of data is transmitted at one time to all of the base stations 106, and then relayed by all the base stations to whatever mobile unit(s) 112 is(are) within its range and that packet then received and stored by the mobile unit 112 within the "listening" range. This operation is completed without any indication being sent back to either the base station 106 or the central unit 102 from any one of the mobile units 112 acknowledging that the data has been received. However, as will be described herein below, it is possible for a central unit 102 to actually contact a particular base station for the purpose of sending information thereto. Of course, there must be some knowledge of the particular mobile unit 112 being within the range of any of the associated base stations 106. Further, each of the base stations 106 are defined as being in a common network, i.e., they will have a common network ID. This network ID is typically associated with a particular program or application operating on the mobile unit 112. Thus, the central unit 102 through knowledge of the network ID can transmit the information to the base stations 106 knowing which application is running on a mobile unit 112. The data that is transmitted as part of the data structure associated with the central unit 102 is therefore application specific. In another alternative embodiment, the central unit 102 may transmit a first portion of the data structure to one of the base stations 106, and a second portion of the database structure to another of the base stations 106 such that a mobile unit 112 only receives the portion of the data structure associated with the base station 106 in which range it resides.

It can be seen that the geolocation marker 116 is also on a common level with the mobile units 112. As will be described herein below, all of the operations of the central unit 102, the base stations 106 and the mobile units 112 in addition to the geolocation markers 116 are synchronous. When a packet is sent, the operation is synchronized to receive information. With the 802.15.4 protocol, each packet can be sent in a synchronous manner such that the packet will be received, but some synchronization signal needs to be received in order to synchronize the entire operation as to the position of a particular packet within the packet stream. This synchronization signal is sent to all of the mobile units 112 and geolocation markers 116 at the same time and, thereafter, the geolocation marker 116 will transmit its beacon to all of the mobile units 112 within its range 118 and then turn off. Then the base stations 106 will utilize that same channel thereafter to transmit information. Again, this will be described in more detail herein below.

Figure 3:
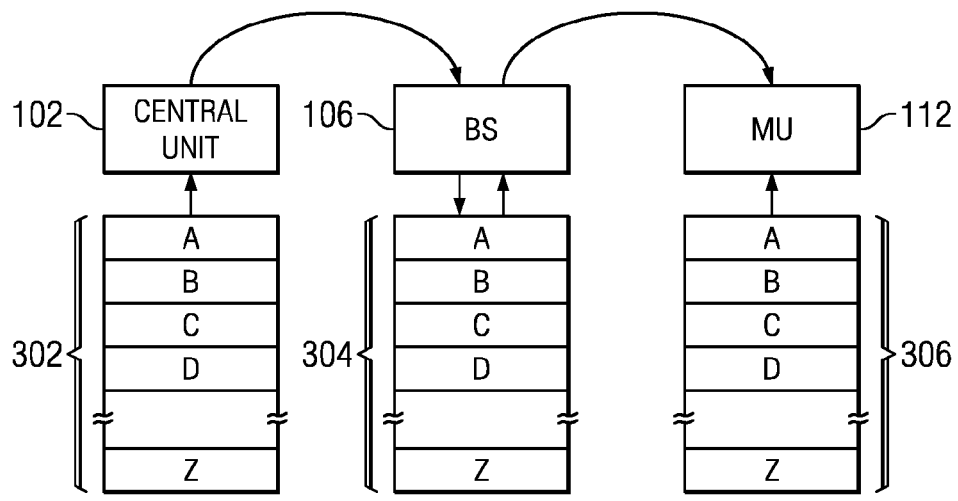
FIG. 3 illustrates the manner in which data is mapped to the mobile unit.

Referring now to FIG. 3, there is illustrated a diagrammatic view of the "mapping" function that is associated with the population of the database in the mobile unit 112. The central unit 102 has associated therewith a data structure 302. This data structure 302 is comprised of a plurality of files. These files are labeled from "A" through "Z." The central unit 102 transmits these files to the base station 106 in a block transfer manner such that they are replicated in a data structure 304 in the base station 106. The base station 106 then transmits on a packet-by-packet basis each of the files to all mobile units 112 within its broadcast range in a broadcast mode. This data structure will then be replicated as the data structure 306 within the mobile unit 112. If the central unit 102 needs to update the file structure, it can update a single file in the file structure 304 or the entirety of the file structure 304. There will be associated with each of the files an ID or version number which ID or version number will define whether it is a current version or an updated version. If the mobile unit 112 determines that the file is already stored, i.e., the version being transmitted by the base station 106 is already stored in the data structure 306, the data packet is ignored.

Figure 3A:
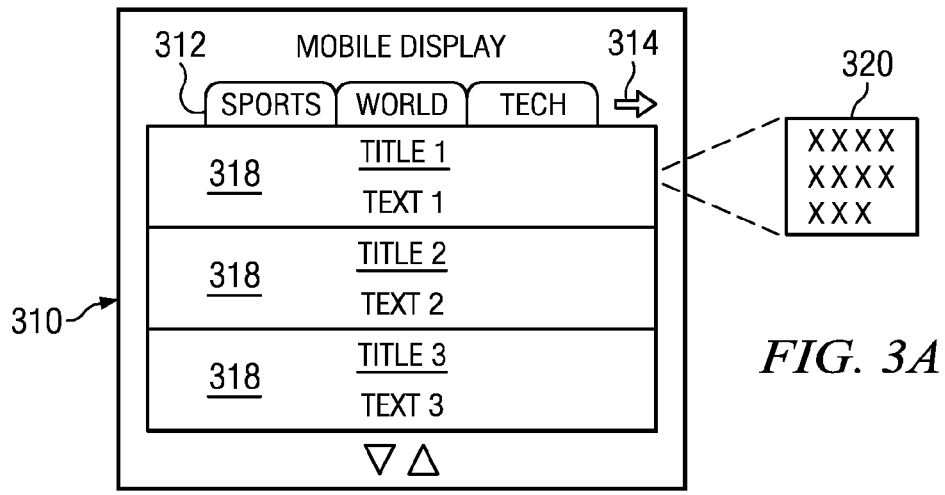
FIG. 3a illustrates a display to which the data is mapped.

Each of the mobile units 112 runs the same application which is associated with the operation of the central unit 102 and the particular network ID of the whole system. One application is illustrated on a display 310 in FIG. 3*a*. FIG. 3*a* displays a plurality of tabs 312 each with a different label associated with information. In this embodiment, there are three tabs labeled "sports," "world" and "tech." There is provided an arrow 314 that indicates that other tabs are available by pressing thereof. Each of the tabs has a plurality of fields 318 associated therewith for storing very short textual information. This will be comprised of a title and an associated text. The title could be the title of a match and the text could be a very short description of that match. If more detail is required, a field associated therewith illustrated by a block 320 can be opened which provides more detail to the text in one of the fields 318. Thus, multiple fields can be provided. What is important to note is that the entire data structure 306 is stored in the mobile system 112. During operation, the application need only look to this data structure 306 in order to display all the information below a certain selected tab, select a different tab or pull up detailed information in the block 320, for example. It is not necessary to go out to the web to obtain the information or to go back to the central unit or any other database remote from the mobile unit 112. Thus, the central unit 102 can populate the entire application database for use by the user without requiring an external connection. Of course, there will also be a field provided in each of the fields 318 that allows for a hyperlink to some web page via a phone or some type of modem connection in the event that mobile unit 112 is realized with a cell phone or a PDA that can access a WiFi, 3G, or 4G/LTE connection.

Figure 4:
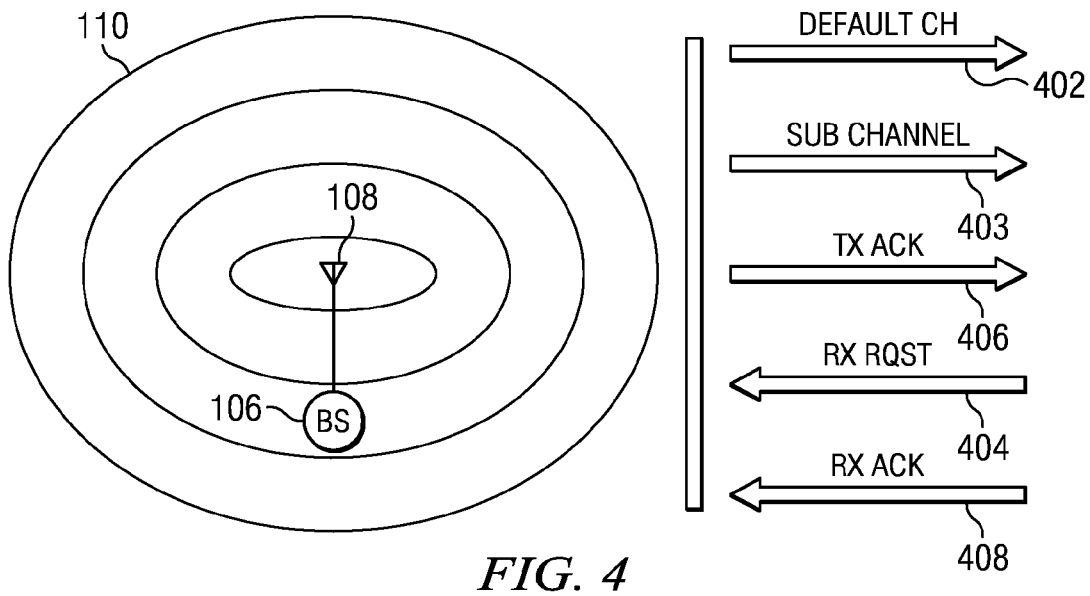
FIG. 4 illustrates the base station panel configuration.

Referring now to FIG. 4, there is illustrated a diagrammatic view of the base station 106 and the various channels associated therewith. The base station, as described herein above, has a processor, an 802.15.4 transceiver and an Ethernet interface. On the mobile unit side utilizing the modified 802.15.4 communication protocol and transceiver, the base station 106 is operable to interface with up to 15 different channels. Each channel transmitting or receiving all with the same antenna 108, but with different receivers/transmitters. A channel is either dedicated to a transmit function or a receive function. There is provided a first channel 402 which is a default channel. This is a transmit channel that is utilized to transmit the sync pulse and the broadcast data. However, the data within the data structure 302 on the central unit 102 can be relayed by the base station via multiple channels. All that is important is that, after a sync is facilitated, data is broadcast. The particular application on a given mobile unit can examine any of the broadcast channels to download the data therefrom. For example, there could be an application that has sports information associated therewith, news information associated therewith and entertainment information associated therewith. There could be provided three transmit or broadcast channels, one for the news, one for the sports and one for the entertainment. The data associated with those three subjects would be contained in the data structure 302 and they would be assembled by the base station 106 and output on the particular channels in a pseudo continuous manner. Therefore, if the application for the particular mobile unit 112 wanted to update its news channel, it would change to the particular transmit channel from the base station 106 associated with news. Further, there could be an alternate "real time" channel that would provide a different type of information for the application. It is just noted that data is broadcast from the base station 106 on any one of the transmit channels that is defined as a broadcast channel without requiring any acknowledgement from the mobile unit 112. There are also provided dedicated receive channels. There is a mode wherein any mobile unit can transmit a receiver request which basically is a request to the central unit 102 via the base station 106 to send some type of information. It may request the base station 106 to send some type of security code or it may request information from the central unit 102 for an interactive application. In this mode, there is provided a channel 404 that allows information to be transmitted from a particular mobile unit 115. This is a common channel to all mobile units 112 and the request is transmitted as an "Aloha" request, meaning that the request is sent out on the receive channel with the hopes that no other mobile unit 112 has sent out a similar request resulting in a collision. If a collision occurs, a later acknowledgement will not be received and the data will not be received indicating to the mobile unit 112 that the request had not been received, requiring retransmission. The base station 106 will send back a transmit acknowledgement signal on a dedicated acknowledgement channel 406. Whenever an acknowledgement is sent, there is an assumption as to when data will be sent to the particular mobile unit 112 on a broadcast channel. This receive request channel is a dedicated channel that will allow multiple mobile units 112 to communicate a receive request with the particular base station 106, thus reducing the amount of information carried by a single channel, and thus minimizing collisions. The data that is sent from the central unit to the requesting mobile unit will be sent in a particular time "slot" within the broadcast information such that all data packets sent to a particular mobile unit 112 or to all mobile units 112 will be sent in the broadcast channel. By designating a particular packet as being addressed to a particular mobile unit 112, all other mobile units 112 will reject the packet. This mobile unit 112 will then send a receive acknowledgement signal back on the dedicated receive acknowledgement channel 408 at the base station 106. By having dedicated receive request channels, receive acknowledgement channels and transmit acknowledgement channels, the amount of information that is transferred thereon is minimal, thus minimizing the possibility of a collision. Further, since there will be some delay in the transmission of the data to a particular mobile unit 112, the time slot at which it will be transmitted is required to be known by the application running on the mobile unit 112.

Figure 4A:
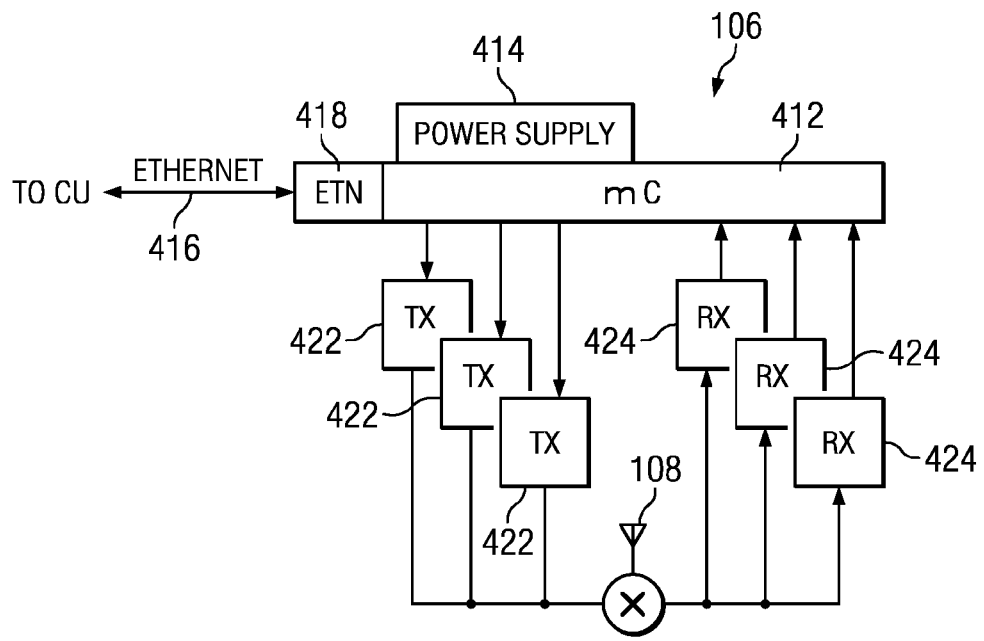
FIG. 4a illustrates a diagrammatic view of a base station.

Referring now to FIG. 4a, there is illustrated a diagrammatic view of the architecture for the base station 106. A microprocessor 412 comprises the heart of the base station 106. A power supply 414 will also be associated therewith, which power supply could be battery operated or it could be a power supply associated with line power. Further, the system could utilize power over Ethernet (POE). An Ethernet connection is provided through a port 416 via an Ethernet interface 418. This is a typical 10/100 Ethernet interface. Each of the receive or transmit channels has a designated transmitter or receiver. Although the particular controller chip associated with the microprocessor 412 could accommodate transceivers, it is configured to provide either a transmit function on one channel or a receive function and not both. Thus, there are illustrated three transmitters 422 and three receivers 424, each interfaced with the antenna 108. In a particular embodiment, the integrated circuit that provides this functionality associated with both the transmitters, receivers and microprocessor is provided by a Texas Instruments CC2530 True System-on-chip Solution for 2.4 GHz, IEEE 802.15.4 and ZigBee Applications.

Referring now to FIGS. 5a and 5b, there is illustrated a timing diagram for illustrating how data is transmitted in the broadcast mode. There is provided one channel in FIG. 5a for a single one of the broadcast channels, noting that there could be multiple broadcast channels. Each of the broadcast channels will first transmit a sync pulse 502. The sync pulse 502 is a sequence of packets of data that will be recognized as to a "type" associated with a sync pulse. Each mobile unit 112 and geolocation marker 116 will recognize this sequence of packets as such. Once a sync pulse 502 has been received, each of the geolocation markers 116 and mobile units 112 recognizes this as a trigger for the geolocation marker 116 to generate a beacon pulse and, for the mobile unit 112, to look for a beacon pulse from the geolocation marker, i.e., for position information. This is achieved by delaying broadcast of information from the base station 106 for a period of approximately 5 milliseconds. The distance between the sync pulses on a broadcast channel is approximately 1 second. By defining a blanking window of 5 milliseconds, indicated by a dotted line 504, the geolocation markers 116 can each then generate a beacon pulse indicated as a pulse 506 within window 504.

There are two geolocation markers 116 illustrated in FIG. 5a, GEO1 and GEO2. The geolocation marker pulse is generated on the default channel. Therefore, each of the geolocation markers has a similar structure to the base station 106 with respect to the transceiver in that it will have one transmitter for transmitting on the default channel and one receiver for being able to receive on the default channel at the minimum. However, additional transmitter channels are provided for allowing the geolocation marker to transmit a data request and also to receive an acknowledgement from the base station when the geolocation marker is required to communicate with the base station. This will be described in more detail herein below. Additionally, it should be understood that each of the mobile units 112 has associated receivers and transmitters to coordinate with the receive channels and transmit channels for the base station 106.

After the 5 ms window, broadcast data is then initiated at a point 508. This data is broadcast in packets until another sync pulse 502 is to be generated. This is a continuous process with the data continually output in a circular buffer manner. Of course, as described herein above, additional data can be inserted into the data stream for purposes of sending data to a particular mobile unit 112 in a point-to-point communication, sending different data than is disposed within the data structure at the central unit 102, etc. However, the original mapping of the data structure to the data structure in the mobile unit 112 will be done in a circular buffer fashion on a pseudo continuous basis.

FIG. 5b illustrates the sequence of events for generating the sync pulse and the beacon pulse. The base station 106 initiates the sync pulse at a point 510 and the sync pulse will arrive at the mobile unit 112 at a point in time 512 and at the geolocation marker 116 at a point 514. The points 512 and 514 times should be approximately the same, depending upon how far from the base station 106 each of the devices is disposed. As soon as the geolocation marker 116 receives the sync pulse, it will process the sync pulse and generate the beacon pulse. Again, this beacon pulse is generated on the default channel only, whereas the sync pulse is generated on all broadcast channels. Therefore, a mobile unit 112 could be listening on a broadcast channel other than the default channel and receive an indication that the sync pulse was received and then know that shortly thereafter, on the default channel, a beacon pulse will be generated. The operation will typically require the mobile unit 112 to switch over to the default channel and determine if a new beacon pulse has been received, keeping in mind that the mobile unit 112 may not be within the range 118 of any geolocation marker 116. However, the beacon pulse will be transmitted at a slightly different point in time 516 from the point in time 514 at which the sync pulse was received due to the set up time and the slight delay. The beacon pulse will arrive at a point 518 at the mobile unit 112 which is at a time when no data is being transmitted on any of the broadcast channels. The mobile unit 112 will examine the default channel to determine if a beacon pulse has been received and, if so, process such and, if not, return to its application. In this manner, the geolocation marker 116 need only wake up for a short period of time before the sync pulse 502 is generated, process the information, such as obtaining coordinate information as to its location, typically from memory, and then transmitting this information followed by going back to sleep. An internal oscillator will run at a very low power to provide a wake up call. The geolocation marker 116 will typically be a battery operated system that is attached to or associated any location that is desirable. This system could have an internal GPS for determining its coordinates but, more preferably, the coordinates are received in an upgrade message transmitted by the base station 106. In an alternative embodiment, the coordinates are loaded into the geolocation marker 116 by a technician or the like. The reason for this is that the geolocation marker 116 may be located inside of a building and the coordinates would have to be manually disposed therein. However, any manner of obtaining the coordinates would be acceptable keeping in mind that low power is important. The geolocation markers 116 should operate for very long periods of time on small batteries. As previously described, the geolocation marker 116 may further include solar panels to charge the batteries when sufficient sunlight is available.

Referring now to FIG. 6, there is illustrated a diagrammatic view of a mobile unit 112 and its various communication layers. As with conventional communication systems, there is provided a physical layer or a (PHY) 602 and a media access control (MAC) layer 604 disposed thereover, with an application layer 606 disposed on top thereof. The PHY 602 is operable to interface with the antenna in accordance with the modified 802.15.4 protocol. This will allow data to be received or transmitted in accordance with that protocol. The received data will then be transferred to the MAC layer 604 or, alternatively, data passed to the PHY layer 602 for transmission. The MAC layer 604 will examine the various packets to determine if they should be further processed by the application layer 606 or discarded. It essentially filters the packets. The PHY 602 will typically be a hardware device whereas the MAC 604 and the APP layer 606 can be defined in software.

Figure 7:
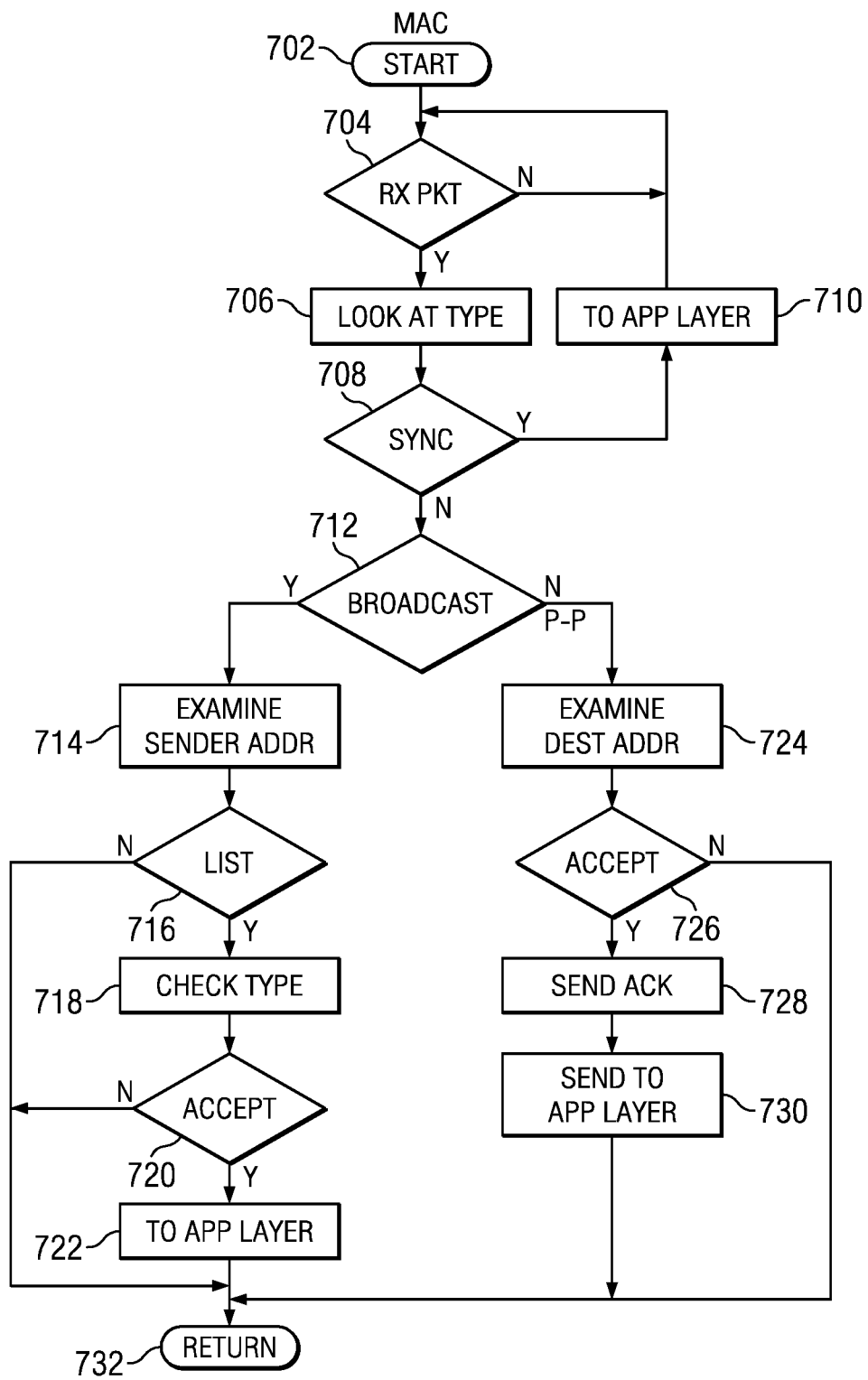
FIG. 7 illustrates a flow chart depicting the operation of the MAC.

Referring now to FIG. 7, there is illustrated a flow chart depicting the operation of the MAC layer. It is initiated at a block 702 and then proceeds to a decision block 704 to determine if a packet has been received. If not, the program flows back to the input thereof. When a packet is received, the program flows along a "Y" path to a function block 706 to look at the Type associated with a particular received packet. Each packet will have a number of fields associated therewith, the first field being the Type field. This field indicates whether the packet is a sync pulse which requires a certain handling, a broadcast packet of many different types or a point-to-point packet. These are all handled differently by the application layer. If it is a sync pulse, this is determined at a decision block 708 wherein the pulse will be directly transferred to the application layer and then the program will return back to the input of decision block 704. A sync pulse indicates to the application layer such things as the network ID, minimum version numbers, etc. This also indicates to the application layer the network ID. Each application, as described herein above, is associated with a particular network and this network ID will provide an indication to the application layer whether it is operating on the appropriate network ID. If not, then a different application can be launched if that application is resident on the particular mobile unit 112. If the application is not resident on the mobile device 112, an indication can be provided to the user to download such application from a web based host. However, if it is resident, it will be launched. In another mode, if no application is running, there will typically be a light application running that will do nothing more than examine the sync pulse. When the sync pulse is received, then the application is launched, in conjunction with a network ID with the assumption that the application is resident on the mobile device. For example, when a user is traveling from one city to the next, the user will arrive at the city and turn on their mobile unit 112. This mobile unit will come on and determine that a sync pulse has occurred whenever it enters into the transmission range 110 of a base station 106. When this occurs, the network ID is examined and the appropriate application launched or downloaded and launched by the mobile unit 112.

If the Type is not determined to be a synch, the program will flow along a "N" path to a decision block 712 to determine if the broadcast Type is indicated. If it is a broadcast packet, the program will flow along the "Y" path to a function block 714 to examine the senders address in block 714 and then flow to a decision block 716 to determine if the senders address is in the list. If not, the program returns and rejects the packet. If it is in the list, the program then flows to a function block 718 to check the Type. If the type is correct, the program determines at a decision block 720 that it is acceptable. Further, with a broadcast packet, the parameters of the packet are examined and one of these parameters or fields indicates the packet ID for that particular packet which is designated for a particular location in the database. This is reviewed against previous information stored at the MAC layer and, if the packet is a newer version of the previous packet, it will be accepted. If not, it will be rejected. If the packet is accepted, it is then passed to the application layer, as indicated by the decision block 722.

If a broadcast packet was not received and this is a point-to-point packet, the program would flow from the decision block 712 along a "N" path to a function block 724 to examine the destination address. If it is the appropriate destination address for the mobile unit 112 receiving the packet, the program will determine at a decision block 726 to accept the packet and pass it along the "Y" path to an acknowledgement block 728. If not, it will reject the packet. The acknowledgement block 728 sends back a receive acknowledgement indication on the channel 408. The receive acknowledgement indication is to indicate to the central unit 102 via the base station 106 that the packet has been received. The program then flows to a function block 730 to process and send it to the application layer and then to a block 732 in order to return to decision block 704.

Figure 8:
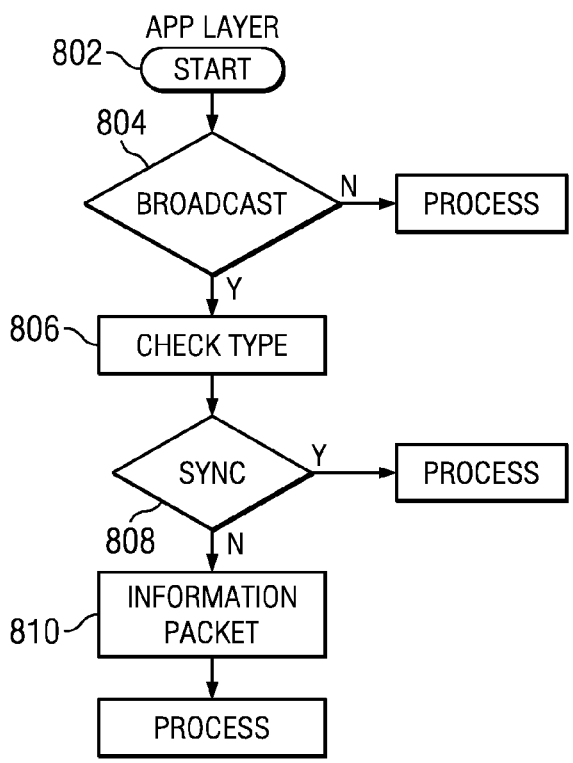
FIG. 8 illustrates a flow chart depicting the operation of the application layer.

Referring now to FIG. 8, there is illustrated a simplified flow chart for the application layer, which is initiated at a start block 802 and then proceeds to a decision block 804 to determine whether the packet was a broadcast packet or not. If it is a broadcast packet, the program will flow to a function block 806 to determine the type. If it is a sync packet (noting that "pulse" and "packet" will be used interchangeably throughout relative to the sync operation), as indicated at decision block 808, the program flows along a "Y" path to process the synch pulse. In processing the sync packet, the first thing that will occur is that it will examine the contents of the synch packet to determine if the correct network ID is associated therewith and, if so, it will then proceed to switch to the default channel, if it is not already on the default channel, and look for the next packet being the geolocation packet. Of course, the mobile unit 112 need only ensure that it is on the default channel and the next packet received will be the beacon packet from the geolocation marker 116. The reason for this is that the systems are entirely synchronized together such that no broadcast data will be transmitted from the base station 106 during the time the beacon packet is transmitted and the beacon packet will not be transmitted during the time that broadcast data is transmitted. If the sync pulse was not received and this was data information or geolocation information, the program would proceed on the "N" path to function block 810 to process the information packets in the broadcast data.

Figure 9:
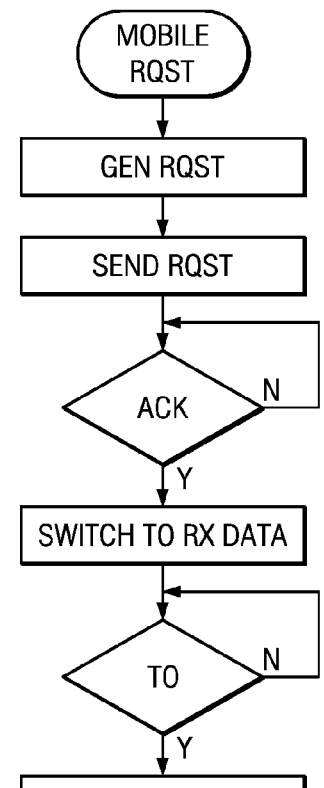
FIG. 9 illustrates a flow chart depicting operation of a mobile request.

Referring now to FIG. 9, there is illustrated a flow chart depicting the operation wherein a mobile request is made, i.e., the mobile unit 112 sends a request for information to the base station 106. This is initiated at a block 902. The program then proceeds to a block 904 to generate the request and then to a block 906 to send the request. This request is sent out on the dedicated Rx RQST channel 404 which is dedicated to only receiving requests from the mobile units 112. These are transmitted on an "Aloha" basis which means that none of the mobile units 112 sends the requests in a synchronized manner; that is, the requests are sent at any time and any collision of the request results in the request not being received. In such a case, the requests have to be sent again at a later time.

Once a request is sent out, the mobile unit 112 will then go to an acknowledgement decision block 908 to await an acknowledgement signal back from the base station 106, and this acknowledgement signal will be received on a dedicated channel 406. Again, there will be very little information sent on these channels but a dedicated channel keeps the broadcast channels free. Once the acknowledgement signal has been received, the programs flows along the "Y" path to a function block 910 to switch to the broadcast channel to receive the data and then to a decision block 912 to wait for the information to be received. At the decision block 912, if the time out has occurred, i.e., no response has been received within the appropriate time, the program will flow along a "Y" path to request the response again in block 914. Typically, a 200/500 ms time frame is allowed to receive the response. If the system has not timed out at the decision block 912, the program flows to a function block 916 to receive the response and process the response and then to a return block 918.

Figure 9A:
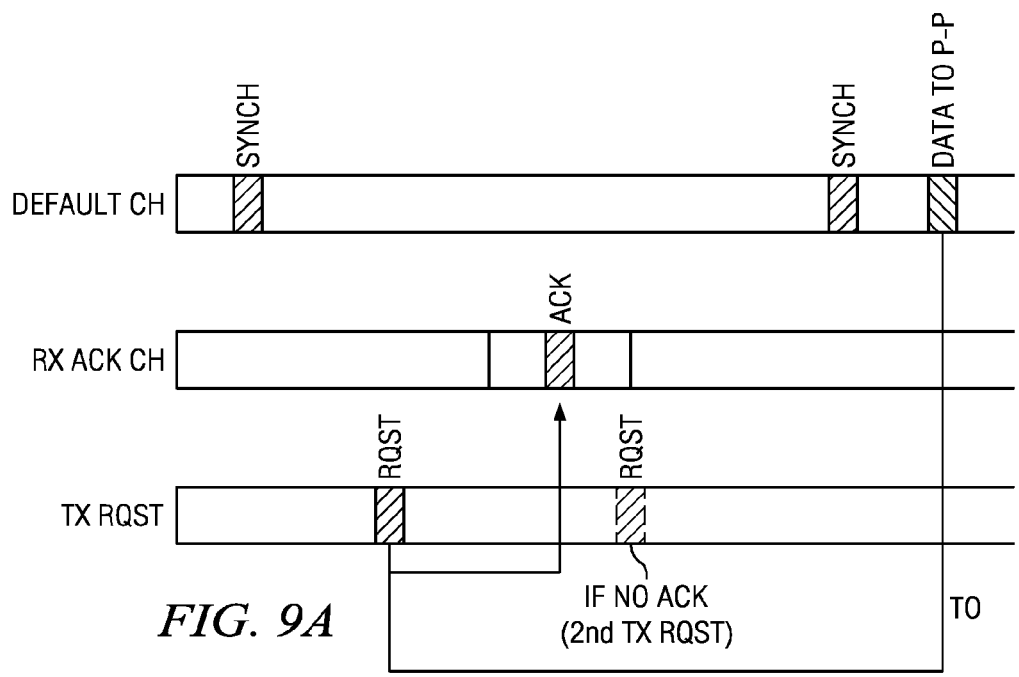
FIG. 9a illustrates a timing diagram for the communication request from the mobile unit.

Referring now to FIG. 9a, there is illustrated a timing chart to show the relative time within which requests are sent and responses are received. The request can be transmitted at a time 920 relative to a sync pulse 922. A receive window 924 is defined within which the receiver at the mobile unit expects to receive an acknowledgement signal at a time 926. However, if the acknowledgement is not received, a second request will be sent at a time 928. The acknowledgement signal merely indicates that the request has been received. The response data, however, is sent at a much later time within the broadcast or default channel at a time 930, which may be after the next sync pulse. Typically, there is some delay from the time that the data request has been sent to the time that it will be received.

Figure 10:
FIG. 10 illustrates a diagrammatic view of the overall packet as defined in the PHY layer.
Figure 11:
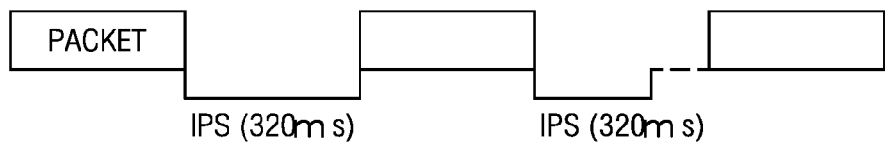
FIG. 11 illustrates the inter-packet spacing.

As described hereinabove, the physical layer operates at a 2.4 GHz band of the 802.15.4 standard. Since the standard utilizes the ISM band, and to avoid any collision with signals from another network which will be deployed in accordance with the 802.15.4 standard, the channel frequency has been redefined to modify the operation thereof. The standard or specification defines the channel spacing as being 5 MHz. The channel spacing is maintained, but the center frequency of each channel is shifted by 2 MHz. With this shift, the number of channels is reduced from 16 to 15 with respect to the standard. The packet definition in accordance with the standard is shown in FIG. 10. In FIG. 10, it can be seen that the first portion of the packet is the preamble, followed by the start of frame delimiter. This is followed by the frame length and then the payload. It is noted that the 802.15.4 packet is a packet that is transmitted basically one time and the receiver is required to synchronize with the preamble of the packet and receive the ensuing data. With respect to FIG. 11, each of the packets in the transmission over the transmission channels such as the default channel are separated by inter packet spacing (IPS) which is a minimum period of time which needs to be blank between the two packets. The minimum IPS set forth is 320 µs. The IPS is utilized to allow the receiver sufficient time to properly set up the packet reception between two different packets, since each of the packets is transmitted with the structure set forth in FIG. 10.

Figure 12:
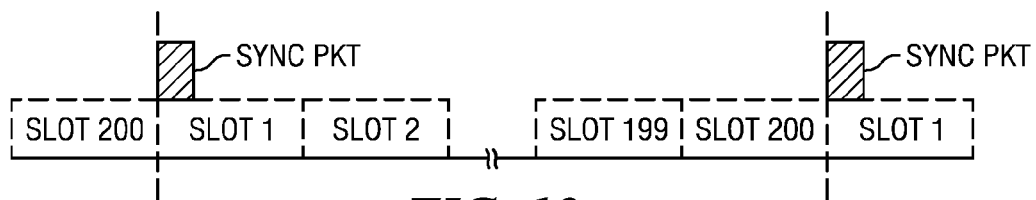
FIG. 12 illustrates the utilization of slots in the transmission channels.

As noted herein above, the distance between two synch pulses is one second. Since the base station 106 utilizes independent channels for the Rx and Tx operations, a quick exchange of information is not possible. The slot definition is utilized to exchange information between two different devices on the system, i.e., the base station 106 and a mobile unit 112. FIG. 12 illustrates the arrangement of the slots. Each sync pulse is separated from the other by one second and this time frame is divided into 200 slots from Slot 1 to Slot 200. The first slot, Slot 1, is reserved for the synchronization packet followed by the beacon packet.

Figure 13:
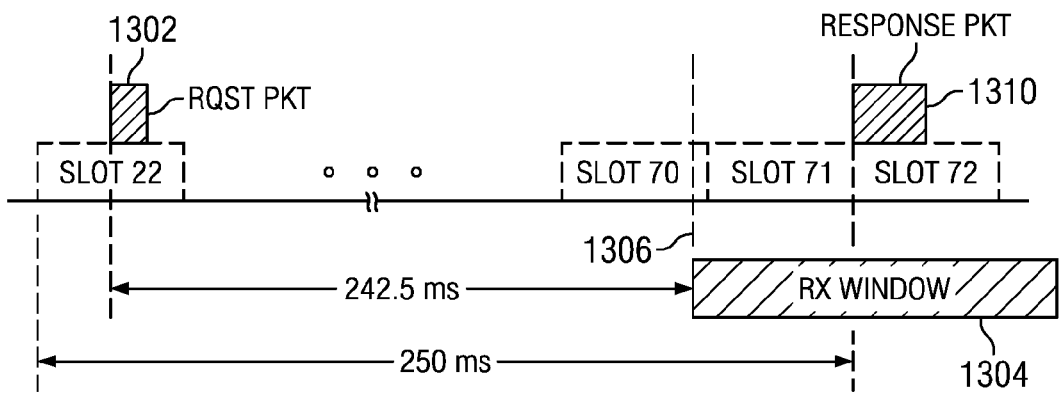
FIG. 13 illustrates a more detailed diagrammatic view of the request packets.

With respect to FIG. 13, there is illustrated a more detailed diagrammatic view of the mobile request packet and how the slots are utilized to define a receive time. Since each receiver is synchronized with the frame, i.e., from synchronization packet to synchronization packet, the receiver will date the instant of reception of each packet by using the slot number as the data or index. Thus, as each packet is received within a particular slot, a counter is incremented from a value of "1" up to "200." As noted herein above with respect to FIGS. 9 and 9*a*, and referring now to FIG. 13, when a mobile unit 112 or geolocation marker 116 wants to request information from a base station 106, a packet request 1302 is transmitted on the Rx request channel 404. It is noted that both the geolocation marker 116 and mobile units 112 all send requests on a common channel, as noted herein above. If the request requires a response, this response will be sent from the base station 106 a predetermined number of slots later, 50 in the example of FIG. 13. Of course, any number of slots could be utilized. Thus, the sender of the request, the mobile unit 112 or the geolocation marker 116, must enable its receiver during this timing window for a period of 10 to 15 ms minimum, centered on the defined slot number in order to account for any variations in the timing. Thus, there will be a receive window 1304 define which will be initiated at a time 1306 prior to the expected time of receipt of the response packet. In this example, the request packet was generated in slot 22 and, thus, the system would be set up to automatically receive the response packet in slot 72. It is not necessary for any information to be sent to the base station 106 by the mobile unit 112 or geolocation marker 116 in order to define the receive slot for the response packet as this is predetermined. The point 1306 occurs in slot 72 such that it has at least one slot or more prior to the expected reception of the response packet. Thus, the receiver will be turned on when the response packet, defined by reference numeral 1310, is received. As noted herein above with respect to FIG. 9*a*, if the response packet was not received when expected, the requesting device will renew its request. The geolocation marker 116 is required to minimize its power consumption. Thus, they will go to sleep for the time between the initiation of the request packet and the opening of the receive window. The mobile unit 112, on the other hand, may be constantly in the Rx mode on the particular broadcast channel and, thus, it will utilize a different timer to manage the delay. As noted herein above, if the mobile unit 112 is in the receive mode on another channel other than the default channel, it must utilize the internal timer to switch to the default channel in order to receive the response. Alternatively, the response packet could be transmitted on all broadcast channels to ensure reception.

As noted herein above, the central unit 102 has the prime responsibility for the selection and construction of the various packets in the data structure and, after selected and organized in the data structure, this data structure is then transmitted or mapped to the base station 106 for subsequent relay or mapping to the mobile units 112. The exchanges between the central unit 102 and the base stations 106 are at either a message level or at a block level. A block is comprised of a set of messages disposed in a defined sequence and order whereas the message is a single message and the message level is reserved for real-time messages. The block concept is utilized primarily to simplify the package storage and the queue organization at the base station 106. The real time packets at the message level are utilized for point-to-point (PTP) transmission. Ideally, the PTP packets are transmitted only one time by the base station 106 and immediately acknowledged by the mobile unit 112. After the reception of an acknowledgement, the PTP packet is discarded by the base station 106. If the acknowledgement is not received, the packet is repeated up to three times and, if it has never been acknowledged, an error report is sent to the central unit 102. Additionally, the real-time packets are also isolated because they will change frequently. These packets are used to carry real-time information like time tables or sports scores, and the carrier information will be refreshed at a period of less than a minute.

Figure 14:
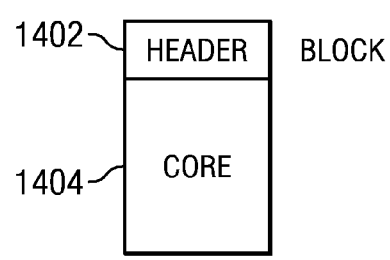
FIG. 14 illustrates a diagrammatic view of the block transfer operation.

Referring now to FIG. 14, there is illustrated a diagrammatic view of a block which is comprised of a header 1402 and a core 1404. The block is defined to contain a maximum of 16384 packets. The header will contain a plurality of fields. They are defined as:
Number: defined on 2 bytes giving the block number;
Version: 1 byte;
Revision: 1 byte;
Size: 2 bytes, give the number of packets stored in the blocks;
Queue: 2 bytes: queue ID to associate with the block;
Date: 4 bytes (day/month/year);
Next Tx index: 2 bytes, used to store the index of the next packet to transmit;
Index table [size+sign 1]: defined on 4 bytes, gives the relative offset of the first byte of each packet. The last index table will be used to define the end of the last packet.

The header size will depend on the number of packets stored in the block. The size is defined by: 2+1+1+2+2+4+2+4*(size+1)=14+4*(size+1) bytes.

The core 1404 of the block will contain the packets and will not have a fixed size. The index of the first byte of the packet N is given by index table [N], wherein the index of the last byte of the packet is given by index table [N+1]−1.

The real-time packets are identified by two parameters, they being the channel and a two byte packet identifier. These packets could be diffused on more than one channel. Since 15 channels are defined, the header will contain 2 bytes, 1 bit per channel to list the channel(s) used to transmit the packet. The packet identifier is used by the base station 106 to store the real-time packets. The real-time packets are stored according to the identifier and, upon reception of a real-time packet, the base station 106 will first determine if a packet with this identifier already exists and, if yes, the received packet will replace the current one. If not, the received packet will be inserted in the first priority queue (described herein below) of the channel on which it must be transmitted. The identifier of these packets is stored in the first priority queue of the channel (described herein below).

Of course, for a PTP packet, the central unit 102 will specify the channel number on which the packet must be transmitted. In some cases, when the system is using more than one default channel, the central unit 102 could not know on which channel the destination mobile unit is listening. As such, the PTP packet will be transmitted on all broadcast channels.

In transmitting information from a base station 106 to a mobile unit 112, a lot of the information will periodically be repeated. However, as the data structure is mapped to the various mobile units 112 within the transmission range of the base station 106, some information needs to be updated on a more frequent basis than other information. In essence, there will be a priority associated with information. For example, PTP packets have the highest priority since they are real-time. There are other types of packets, such as response packets to user interactivity with the base station 106 that also will have a higher priority. The goal, in general, is to deliver in real-time urgent information and, with a larger delay, the information which may not be as critical. As an example, consider a system that is deployed in Paris. Information concerning bicycle slots in various rental stations disposed about the city, known as Velib stations, will be transmitted in real-time. This is necessary so that users within the system can have relatively up to date information about the availability of bicycles slots in which to park their rental bicycles. It may be that the update would be required to be made once per second or once per 5 seconds, as compared to news information which would only have to be updated one time per minute, for example. To facilitate handling different priority messages, a weighted queue is employed.

Figure 15:
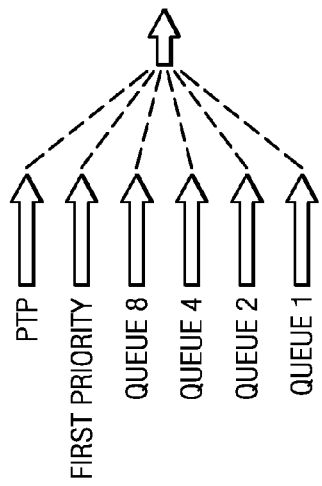
FIG. 15 illustrates a diagrammatic view of the message queue technique.

Referring now to FIG. 15, there is illustrated a diagrammatic view of the various queues. The highest priority is on the left and the lowest priority is on the right. On the left is a PTP priority queue, followed by a first priority queue, followed by a queue 8, a queue 4, a queue 2 and a queue 1 priority. Each of these queues is a first in, first out (FIFO) queue. Once the data is disposed within the queue in the form of messages, it is then pulled out of the queues in a predetermined weighted order, as will be described herein below, placed into a packet and transmitted. As will be described herein below, there is a segmentation and reassembly field within each packet that defines how the packets are to be identified and grouped upon reception.

As noted herein above, the main task of the base station 106 is to transmit on active channels the packets which have been downloaded by the central unit. When a channel is activated, the base station 106 will transmit continuously the packet information and will add periodically a synchronization packet which will be used for geolocation purposes, these synchronization packets disposed one second apart, as described herein above. The synchronization packet is followed by broadcast packets. These broadcast packets will be repeated periodically. The period of repetition will depend upon the number of different packets to be sent and on the weight of each packet in the priority queues. Thus, the packets are sent in a circular buffer type style and they are "substantially" continuous in nature. The word "substantially" is utilized to define the fact that synchronization packets are disposed within the broadcast stream, with a one slot delay provided after the synchronization packet to allow the beacon to be transmitted and PTP packets can be inserted into the data stream.

The PTP queue is a queue wherein each packet stored therein will be transmitted only once and it will be transmitted immediately, i.e., the highest priority. This is mainly utilized to store the PTP packets. This, of course, could be repeated up to three times if an acknowledgement has not been received on the associated Rx channel. The first priority queue is a queue in which packets will be sent after each synchronization packet. Thus, all of the packets in the first priority queue must be sent before other packets are sent. The remaining packets are defined as the queue 8 priority buffer, the queue 4 priority buffer, the queue 2 priority buffer and the queue 1 priority buffer. After transmission of the synchronization packet and the packet stored in the first priority queue and the PTP queue, the base station 106 will then sequentially send the packets stored in queue 8, queue 4, queue 2 and queue 1. It will first send 8 packets from queue 8, then four packets from queue 4, then two packets from queue 2 and then 1 packet from queue 1. It will then loop back around to queue 8 and send an additional 8 packets from queue 8, 4 packets from queue 4, etc., until the transmission of the next synchronization packet. It will continue cycling through these four queues. However, if additional information is stored in the PTP buffer or the first priority buffer, these will take precedence over the other buffers.

Figure 16:
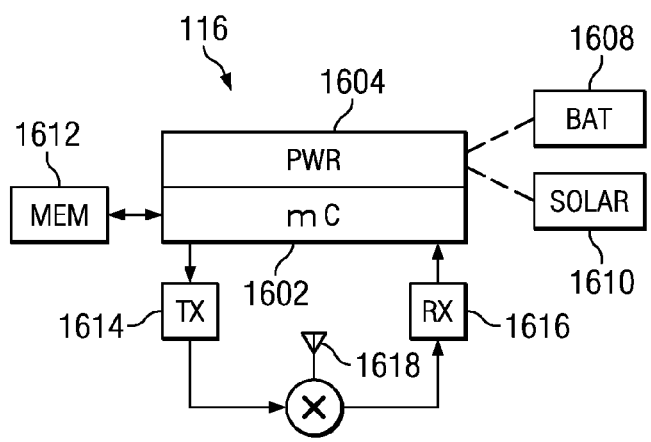
FIG. 16 illustrates a block diagram of the geolocation marker.

Referring now to FIG. 16, there is illustrated a diagrammatic view of the geolocation marker 116. As described herein above, each of the geolocation markers is a self contained unit that is disposed at a predetermined location by some technician. It is designed to, in normal operating mode, transmit data on the default channel 402 after reception of the synchronization pulse and then go to a low power mode. The power level during transmission in the normal operating mode is quite a bit less than the base station such that a mobile unit must be in close proximity thereto in order to receive the beacon signal. The beacon signal will contain location information in the form of latitude and longitude, in the preferred embodiment. However, it could also contain other information that would provide some relevance to a physical location. For example, it could somehow be tied to a map such as being at some coordinate such as a hallway or the such. It could also be identified to some type of store which could be used by an application to indicate thereto that the mobile unit 112 had moved in close proximity thereto. However, in the preferred embodiment, the latitude and the longitude is utilized. This information can either be received from a base station 106, provided by a real-time GPS (not shown in the current application), or be input thereto by a technician. The GPS receiver is undesirable from the stand point of power consumption since the geolocation marker 116 will be disposed in a powered down configuration after transmission of the beacon. The geolocation marker 116 has provided therein a low power microcontroller 1602 which is basically the same microcontroller utilized by the base station 106 and by the mobile units 112. Power is provided by a block 1604 that can be provided by a battery 1608 or a solar panel 1610 or a combination of both. A memory 1612 is provided which basically is a flash memory that is part of the microcontroller chip 1602. The self contained chip also has a transmitter 1614 and a receiver 1616 that are both interfaced with an antenna 1618. The microcontroller 1602 and the transmitter and receiver are configured by the initial configuration information to operate on the default channel.

In general, the geolocation marker 116 will be disposed in many different areas within the broadcast range of a given base station 106. It could be disposed at specific places in a town, an attraction park, a mall, an airport, etc. This will assist the user to localize the mobile unit 112 for the purposes of interfacing with the applications running on the mobile unit 112.

This geolocation marker 116 is operable to transmit the geolocation packet, i.e., the beacon, with a limited power, such that only the mobile unit 112 present in the small area 118 proximate to the geolocation marker 116 will be able to receive the packet. The radius of this transmission could be in the order of 10 or 20 meters.

Figure 17:
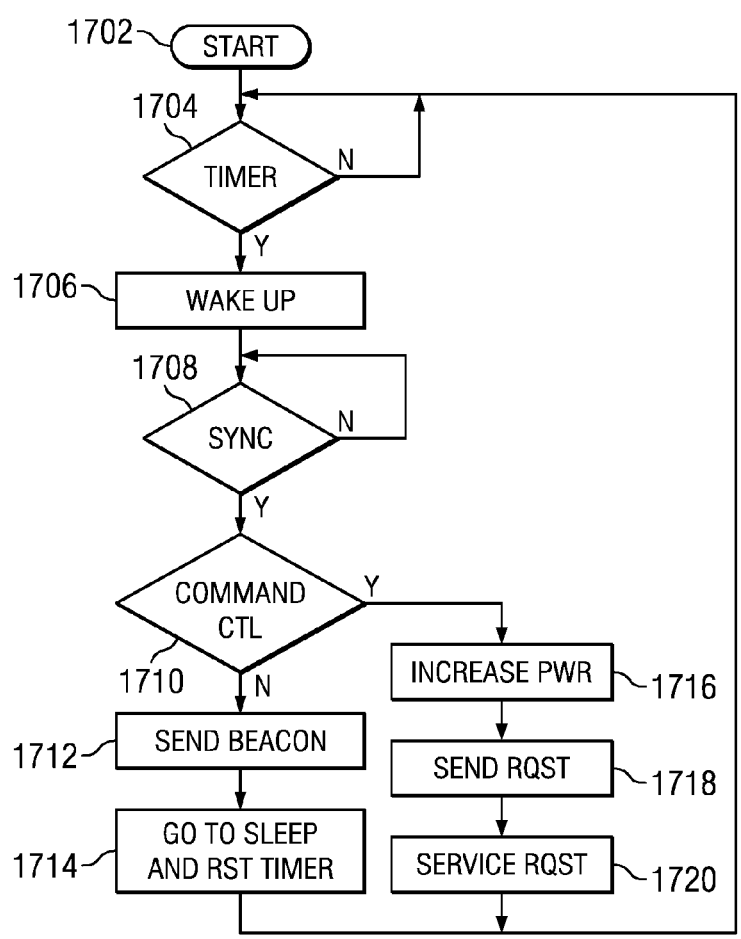
FIG. 17 illustrates a flow chart for the operation of the geolocation marker.

Referring now to FIG. 17, there is illustrated a flow chart depicting the operation of the geolocation marker 116, which is initiated at a block 1702 and then proceeds to a decision block 1704 to determine if the internal timer has indicated that the receiver should be turned on to receive the next synchronization packet. Until the timer has timed out, the program will return back to the input of the decision block 1704 to maintain the microcontroller in a powered down state. When the timer triggers, the program flows along the "Y" path from the decision block 1704 to a function block 1706 to wake up the receiver and then to a decision block 1708 to await the sync pulse. This will loop back around to itself until the sync pulse is received. If the sync pulse is not received within one or two seconds or even less, this will cause the geolocation marker 116 to go into a mode where it will increase its power and send a request to the nearest base station 106 indicating that there is a problem. The base station 106 can identify this geolocation marker 116 and take the appropriate actions. However, when the sync pulse is received, the program will flow along the "Y" path from the decision block 1708 to a decision block 1710 to determine if a command control field has been set to the appropriate bit within the sync pulse. This command control packet will place the geolocation marker 116 into a different mode than the normal mode of generating a beacon. If a command control signal has not been received in the appropriate field, the program will flow along a "N" path to a function block 1712 to send the beacon within the first time slot and then to a function block 1714 to go back to sleep. The timer at that time is reset to wake the next one second wake up call for the next sync pulse. The program then returns back to the input of the decision block 1704.

If the command control field indicated there were some necessary information to be obtained from the geolocation marker 116, such as status information, the program will flow along the "Y" path from the decision block 1710 to a function block 1716 to increase the power level and then to a function block 1718 to send a request for transmission of a packet and then to a function block 1720 to service the request. This is very similar to the operation of sending a message from a mobile unit 112, as described herein above with respect to FIGS. 9 and 9a.

The messages for being transmitted from the base station 106 to the mobile unit 112 are classified into two types of packets, broadcast packets and point-to-point (PTP) packets. The PTP packet with acknowledgement will contain the channel number on which the acknowledgement will be sent. This allows the mobile unit 112 to switch to the appropriate channel for listing. However, it could be that the PTP packet could be transmitted on all channels as data is broadcast on those channels, but this is not the most efficient manner of operating.

For broadcast channels, as described herein above, they are utilized to transmit sports news, local news, world news, etc., local advertisement such as coupons and discounts with web links, a list of points of interest that are present in a particular area, news or services from the particular locale or city, cinema and theater programs, etc. In general, it is any type of information that would normally be disposed in some type of data structure or organization to be accessible via a user interface such as a touch display or the like. This interface was described above with respect to FIG. 3. Returning back to FIG. 3, the manner in which the packets are formatted for this information will be described.

The packet format for the broadcast packet and the display of FIG. 3 are disposed in a multi-level organization scheme. The first level is the page number. The page number defines a tab. In the illustrated embodiment of FIG. 3a, tab 312 associated with "sports" would be page 0. The second page, page 1, would be the "world" tab. The third page, page 2, would be the tab labeled "tech." Within each page, the second tier defines lines within a page and each line has multiple levels of information associated therewith. The first line of a page, line "0," is associated with the tab and this is followed by additional lines, lines 1-63, for each different news item. For the first line of the page, the tab information, it will have the first level of information as the title of the tab. For a tab, only a single level of information is required. This allows the line number "0" to be reserved for the tab name and the numbers 1 through 63 to be reserved for the multiple levels of information associated with the received messages, i.e., the various tiles 318, wherein a tile is an area below a tab, each containing a message. If there are, for example, 20 messages that are to be associated with a particular tab—particular page—there will be 20 tiles 318 provided, each tile having a message disposed therein. Each of these messages or tiles 318 are defined by a line in the page. Thus, for page 0 associated with the "sports" tab, the message coded on the 1 byte field would have the title of the tab associated with the number "0" message (or line "0" message) and for the remaining messages or lines from 1 through 63, the different tiles 318 would have the correct message associated therewith. For example, in message "1" the tile 318 labeled "title 1" in FIG. 3a would have the message associated therewith. The core of the message could be transmitted using more than one packet, using a segmentation and reassembly process. The MSB of this byte will be used to store the level of this message, i.e., the line number within the page.

The level concept is defined by providing three levels "0, 1 and 2" of information All of the "level 0" messages for a single page will be displayed in association with the associated tab within the defined tiles 318, one tile for each message or line/message number. Thus, information associated with level "0" for a particular message or line number would be utilized to populate the respective tile 318. The tile 318 is for displaying level "0" information. For example, text 1 for title 1 are disposed in one of the illustrated tiles 318 and this basically constitutes a summary of the information for a particular message under that particular tab. Associated with that same message labeled title 1 would be more detailed information, as illustrated in the block 320. This is transmitted as level 1 information. Level 2 information would be used to transmit a web link that can be associated with the message. Thus, a single tile or region 318 on a display can be associated with information using the three levels such that the abbreviated form of a news article, for example, would be provided as level "1" information. For example, this could be text that would state "Bolt wins 109.86 at Skorean Meeting—AP Usain Bolt won the 100 meters in 9.86 seconds in his season debut at the Daegu meet on Wednesday. Jamaica's Usain Bolt celebrates . . . " This will be all the information that will be displayed in the tile or region 318 on the display—level "0" information. When going to level 1, the detailed information would be jumped to at the detail box 320. A web link could also be provided in conjunction therewith if such were necessary. The level is coded on 2 bits and there may be a level 3 or more reserved for future extensions.

Some version/revision field will be present in the message for use by the application to refresh the information displayed on the tab, i.e., if information is repeatedly sent, there is no need to refresh the information if it is already stored. If the version/revision field changes, this indicates that the information in the database should be replaced.

Referring now to FIG. 18, there is illustrated the packet format for the packet associated with a level 0 message number 0 associated with the title of a tab. As noted herein above, this is for message number 0 for the given page at level 0, as the tab has only level 0 information associated therewith. The packet has a plurality of fields defined therein. The first field is a Type field, which is one byte in length. This will provide for 256 types such as the SYNC Type, the geolocation type, news type, sports type, etc. There are many different types that could be provided. The next field is the Page field which provides a tab ID for this particular level 0 message. This is the page number. As noted herein above, each tab will have a separate page associated therewith. The next field is a version field which defines the current version of the packet. This version information is maintained in the MAC layer of the logical stack in the receiver and will be utilized to determine whether to discard the packet or not. If it matches a version of the existing packet stored on the mobile device 112, the packet will be discarded. The next field is the level/number field. The level determines whether it is a level 0, level 1 or level 2 packet which, for the tab packet, is restricted to level 0 information. The number portion determines what number message it is at that level. For the tab, this would be a level 0, number 0 (for the first line in the page), as the tab only has a single level of information associated therewith. For other message numbers at level 0, i.e., messages 1-63 for a given page, they would have other levels. For example, the first tile or region 318 for the given tab (page) would have a level 0, number 1 associated with the information in the level/number field, as only level 0 information is displayed in the tile or region 318. The next field is the segmentation and reassembly field (SAR). This is the field that is utilized to handle multi-packet transmission. Since the maximum information that can be carried in a message is around 100 bytes, this would be insufficient when a message is a news report with detail or a file. To work within these constraints, it is necessary to provide some segmentation and reassembly functionality such that multiple packets can be utilized to send the message but they can be sent at different times and mixed in with different packets and later separated and assembled in the correct sequence. There will be provided 2 bytes reserved for this function. 14 bits are for a packet number and 2 bits are for the control. The control bits are the two MSBs. A "00" is the "first packet" definition, i.e., defining the packet as being the first packet in the transmission. The control bits "01" will define the packet as being all other packets except the first or the last packet. The bits "10" are not used and the bits "11" indicate that it is the last packet in the assembly. The first packet, indicated by the control code "0" will be associated with the number of packets which will be used to send the information. If, for example, it is assumed that a packet can carry 100 bytes, with this coding rule, one can transmit a file up to 16383*100=1.56 Mbytes. All packets must have a fixed size which will be a maximum packet size, with the exception of the last one. This constraint will permit the receiver to store the received packet, even if one packet is missing. If, for example, there were a message with a length of 400 bytes, this would require 4 packets. The first packet is known to be the first packet since the 2 MSBs are set to "00." Thus, the number of packets in the entire message can be coded within the packet number for that the first packet. It is not necessary to put all "0s" in the packet number field, i.e., the 14 bit field and, for the last three LSBs, the bits will be coded as "100" defining the total number of packets as 4. Thereafter, each subsequent packet will have a number from "1," "2" and "3" since there are only four packets in the entire message. After the SAR, the message field for the title will be provided labeled "Title" followed by an "Option" field. The Title field can be fit within the 100 byte message length, as it is relatively short. The option field could be provided for such things as the color of the title. The Type field, Page field, Version field, Level/Number field and SAR field comprise the header of the message packet.

Referring now to FIG. 19, there is illustrated the packet format for the web link, the level 2 link. This is a link that provides a web address for some hyperlink that can be utilized by the program. This could be interfaced with the application running on a mobile unit 112 such that the mobile unit 112 could utilize this link to access an outside system on the network via a WiFi, 3G, 4G/LTE or other communication link to the network. This would be included within a string of data.

Referring now to FIG. 20, there is illustrated a detail of the message packet at level 0 (also descriptive of the message packet at level 1) wherein the number is greater than 0 defining a message packet for other than the tab title packet, since number 0 for a given page is associated with the tab. For the message, there are provided 4 strings after the header. The first string is considered to be the title of the entry, i.e., the title of the sporting event. This would be displayed in a predetermined color such as blue. The second string would be the message core and it will be displayed in black in one example. The last two strings are the message source and date, respectively. They would be displayed in a different color such as green. Each of the 4 strings are separated by an ASCII code "0." Thus, the end of each string would have the bits "0000." This would indicate the end of a string.

When a packet is longer than 100 bytes, as noted herein above with respect to the description of SAR, a multi packet transmission must be assembled. Each of these has the same header to identify the packet except that the SAR field changes for each packet in the segmentation sequence. The first packet will constitute the "00" SAR packet with the number of packets in the total packet being defined, there being 4 in this particular example. This first packet would have part of string 1 associated therewith, as illustrated in FIG. 20a, and the second packet would have the remaining part of string 1 and part of string 2 associated therewith. This, of course, depends on the amount of information contained in a particular string. This is illustrated in FIG. 20b. The third packet has more of string 2 disposed therein, as illustrated in FIG. 20c. FIG. 20d shows the fourth packet which contains the remainder of string 2 and also all of string 3 and string 4. It is noted that the core of the message associated with string 2 required part of the second packet, all of the third packet and part of the fourth packet to contain the message. There could be multiple packets, of course, depending upon the size of the message. If a picture were required to be attached to the message, a fifth string could be accommodated which would contain a name of a file where an associated picture is stored. This picture would be transmitted in association with the data structure in a file transfer Type packet that was transferred on a broadcast channel.

Referring now to FIG. 21, there is illustrated a diagrammatic view of the message packet for the detailed information at level 1 for the particular message. The detailed information is limited to a unique string that would be transmitted by utilizing the header and then followed by the string. One string would be acceptable, as a title, date and time are not required. If the string is greater than 100 bytes, then a multi-packet transmission would be required, as was the case with respect to the embodiment of FIGS. 20a-20d associated with the message at level 0.

Referring now to FIG. 22, there is illustrated a packet format for the sync packet. This packet contains various information. In the Type field, the first field, the type is indicated as being the SYNC type. The next field is the geolocation control field which is utilized by the geolocation marker 119 to determine whether any action needs to be taken. This field is ignored by the mobile units 112. This is an 8 bit field with the first two MSBs associated with management. A "00" indicates no report is necessary and all geolocation markers ignore this field. A "01" is a status report request which requests a geolocation marker 116 to send a status report. If this is received and recognized by a geolocation marker 116, that geolocation marker 116 will then power up to full power and transmit a message on the Rx RQST channel 404 to the base station 106. The next management command is a "10" that will indicate that the geolocation marker 116 needs to go into a software upgrade procedure and upgrade itself. This means that the receiver must stay on and receive data and perform the upgrade procedure from the base station 106. The next command for the management bits is the "11" bit which indicates that a message update will be sent, a new encryption key is to be sent or other information. These two management bits, if they are not "00" are followed by a 6 bit geolocation marker ID. This ID is utilized to identify which of the geolocation markers the bits are directed toward. The next field is the key version field which is utilized for a security aspect and the next field, the name field, is for the display properties to allow the name of a network to be displayed. The next field is the network ID field which will be used by the application running on the mobile unit 112 is the correct application for that network ID in order to guarantee that the packet formats are the correct ones. When a mobile unit 112 enters a particular network, it looks at the network ID and compares it with its application. If the network ID matches, then the appropriate application is running. However, if the network ID does not match, then it possibly can launch another application which already resides on the mobile unit 112. Typically, a very light application will be running to search for a sync pulse and, when received, the network ID will be compared to the application running and, if it matches, the full application will be launched. If it requires another application, and that application is resident on the mobile unit 112, then the mobile unit 112 will launch that application. If not, then a pop-up will be received indicating to the user that they need to go to the web or some other network to download another version of the appropriate application associated with that network ID. The next field will be a minimum version field and this minimum version field will be provided such that the user of the application can determine whether it can decode all of the packets. If the user has a software version that is too old, another pop-up box will be displayed to invite the user to upgrade the software.

Referring now to FIG. 23, there is illustrated a diagrammatic view of the packet format for the beacon transmitted by the geolocation marker 116. There is a Type field that indicates this as being associated with the beacon followed by the latitude and the longitude information. This step requires two fields. A last field is provided for the name of the geolocation marker 116.

As described herein above, the data in an application can be arranged in many different ways. By defining types of packets, the data can be organized into various groups. For example, the description herein above with respect to the news broadcast associated with the packets of FIGS. 18-21 will be utilized to populate the table of FIG. 3. However, there are other applications that can require a different packet format in order to populate the various tables. By defining these packets by type, they can be arranged in the data structure such that, when the application wants to populate an area of display, it merely has to extract that information from a particular place in the data structure.

Another type of broadcast packet is an array broadcast. An array broadcast utilizes a format for transmitting live information such as sports results, stock quotes, movie times and the such to the mobile units. Of course, the timeliness of the information is a function of what kind of priority it is assigned within the system. When information is transmitted in a form that lends itself to an array format such as a table, a different format is utilized. This is illustrated in FIG. 24. The table illustrated therein illustrates a plurality of tabs 2402 associated with a particular functionality, in this example a sporting table. The sporting table is associated with various sporting events such as baseball, football, basketball and hockey. The first tab 2402 is labeled "MLB" for Major League Baseball. As was the case with the news, each of the tabs is associated with a page number. The level notion is utilized to populate the information relative to a tab. Thus, level 0, line or number 0 will be utilized to send the tab, title and display options and, at the same time, the size of the array, the number of rows and the number of columns. At level 0, from lines 1 to 63, the content for a particular line will be sent and each of these at level 0 will constitute a row of an array. The next level, level 1, will provide detailed information for a row. For example, if an array is used to display baseball results, the table information may be, as illustrated, one column for the home team, one column for the away team and their associated scores, one column for the inning and other columns for other aspects regarding the action. The first row could be an actual heading row but this would just be a row that is populated for this information. The first row illustrates the "home," "away" and "inning" information. The subsequent rows provide in, for example, the home team column, the three letter abbreviation for the team and its score. When any row is selected for detailed information, this will provide another box that will open, preferably to fill the entire screen and to find box scores in a block 2408 and a web link in a block 2410. The web link will be provided by level 2 information. The packet for the title in the tab will set forth the header, as described herein above with respect to all of the packets, the number of rows in an associated field, the number of columns in the next field, the title in the next field and the options for the tab such as color, in the last field, as illustrated in FIG. 24a. This is similar to the news operation. FIG. 24b illustrates the other lines for a given page after line "0" for the tab. This will set forth a plurality of strings after the header. Each of these strings define the information in the column. For example, string C1 in line or number 1 would be the word "home." String C2 would be "away." For the second line or number, string C1 would be the text "TEX 2" for the team and the score All that is required in order to update this information is for the central unit to send out the information to the base station for relaying in its data structure transmission each time it repeats the data structure. In this manner, the table can be continually populated. This table is a high priority table. It is not a data structure that is loaded into the data structure of the mobile unit 112, as was the case with the news information which is not as time sensitive. This table information is the highest priority data after the PTP packets. When the table is selected from an option associated with the running application, the application will the "grab" the appropriate information from the data stream on the default broadcast channel. This data is updated every minute or so. Thus, as the new data is generated, it is put out on the broadcast channel and then immediately displayed. It is not necessary to store this data, as retrieving this data from local memory makes no sense. When new data occurs, it will always have a new version and will be accepted and used to update the associated row at level 0.

Referring now to FIG. 25, there is illustrated an alternate operation wherein the table is utilized for sending information about movies. This operates in a similar manner in that there are provided a plurality of tabs 2502 that are associated with a cinema and, under that cinema would be provided a plurality of rows and columns wherein each row would define a header for defining each of the columns and the subsequent ones would provide the information for that column such as the movie title, the time, the length and the rating. As with the sports array, a detail block 2506 could be output. There would be associated title and row packets similar to FIGS. 24a and 24b.

Figure 26A:
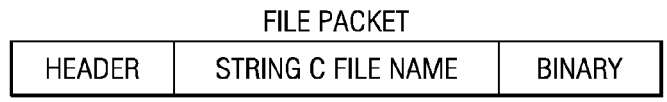
FIGS. 26a-26c illustrate the packet format for transferring a file.
Figure 26B:
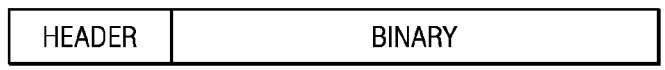
Figure 26C:
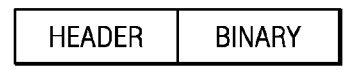

Referring now to FIGS. 26a, 26b and 26c, there is illustrated a detail of the transmission of a file packet. This type of packet is a broadcast packet and is utilized to download a file that will be stored by the receiver in the file system. These files could contain a picture or an icon to illustrate the display. They will be stored in a common temporary directory to be shared by various applications. In general, the packet format will be comprised by two fields after the header. The first will give the file name and the second will be binary information to store in the file, i.e., the file content. The illustration in FIGS. 26a-26c illustrate the use of segmentation since multiple packets will be required to send a file. An end of string ASCII character will be utilized such as 0x00.

Another type of application would be that utilized to transmit an advertisement to a mobile unit 112. In general, this advertisement would be defined by the type field in the header and, thereafter, the information would be stored accordingly. Such advertisements would be utilized in areas such as towns, malls or in airports. Each of the advertisements needs to be filtered and classified. To facilitate this, each advertisement pack will contain a rubric. It will also contain such things as coordinates of the shop in order to display a marker on a map. The level notion is utilized for organization purposes mainly to define that the advertisement is comprised at level 0 of a short summary of the advertisement with the second level 1 providing a detail of the advertisement and the last level 2 providing some type of web link. However, there is no reason to utilize the concept of pages but, for filtering purposes, all of the advertising packets will be organized in pages, such that one page might be advertisements associated with news format, one for sporting events, one for restaurants, etc. This basically provides a way to sort the advertisements by types of advertisements, for example, one page could be dedicated for use just for coupons.

The main advertisement which is associated with level 0 for the advertisement would be associated with the line number or message number from 1 through 63 which, with message "0" reserved for the tab title, i.e., "coupons." The information associated with the main advertisement would be comprised of a plurality of fields after the header. These fields would contain the following information:

Field 1—main rubric, i.e., hotel/motel, restaurant, housewares, personal attire (clothing, shoes), cosmetics, supermarket, . . . ;
Field 2—sub-rubric: utilized to provide a finer grain of classification which could be coded in 1 byte with 2 bits provided for the level of a restaurant, for example, i.e., low cost, basic, normal, luxury;
Field 3—geolocation information in the form of latitude and longitude in 2 bytes;
Field 4—shop name;
Filed 5—address;
Field 6—phone number; and
Field 7—a short summary of the offer.

All of this information is not necessary to display the information. It can be utilized for different aspects. For example, the geolocation information could be utilized to locate the restaurant or advertising entity on the map. The rubrics could be utilized to define an icon, for example. If it were a hotel or a restaurant, a predefined icon could be utilized on the map. Further, if it were a quality restaurant, a particular type of rating such as four stars, could be associated with the advertisement. As with the other packet information described herein above, the detailed information is level 1 information that can be provided with the header followed by a string with detailed information. This is the same with respect to associated web link information at level 2.

Figure 27:
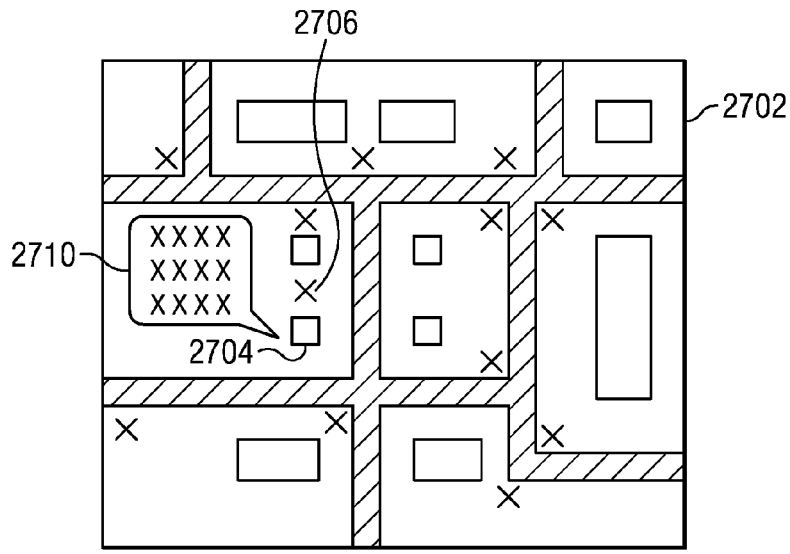
FIG. 27 illustrates a diagrammatic view of a display associated with an advertisement on a map.

Referring now to FIG. 27, there is illustrated a diagrammatic view of how the advertisement is associated with a display. In this illustration, there is provided a map on a display 2702. This map is comprised of a plurality of buildings and the such. For illustrative purposes, this map on the display 2702 defines a certain area that can be viewed. There are provided a plurality of "x's" that are associated with geolocation markers. These geolocation markers would not be indicated on the actual map on the display. However, it can be seen that the geolocation markers are disposed at corners of various roads and the such. There is one building 2704 that has associated therewith an advertisement. When an individual passes by a geolocation marker 2706, for example, this could trigger the display of an advertisement that had been previously downloaded. What will happen is that the advertisement will pop-up in a "bubble" 2710 and provide information as to some product or service that is being advertised by that particular location. An icon will be disposed on the map associated with that location that is defined by various information stored in the application. When this advertisement pops up, the user is then allowed to expand this for additional detailed information.

Figure 27A:
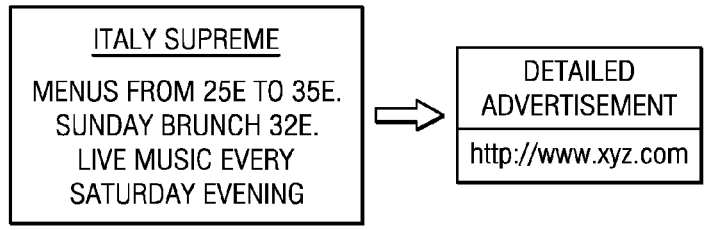
FIG. 27a illustrates a detail of the advertisement.

The ad is illustrated in FIG. 27a and this shows the various information that would be provided. Typically, what would be provided is the name of the store and a summary of the services. This is the title of the restaurant and the information regarding what types of menu it offers and entertainment. The longitude and latitude would not be displayed but, rather, utilized to place the ad onto the map. The geolocation marker itself could be utilized by the application to recognize that the mobile unit 112 had passed by the proximity of the store and, with a straightforward comparison, recognize that an advertisement associated with some vendor is to be displayed proximate to that longitude and latitude. The latitude and longitude associated with the advertisement would then be utilized to place the advertisement upon the map in a particular area. The detail is illustrated in an expanded box showing the detailed advertisement and the web link.

In another application referred to as virtual queuing, the system is utilized to allow a recreational park having a large number of attractions to be managed. In general, people roam around a theme park and go from one attraction to another. All of these attractions have some type of queue, depending upon the popularity of that attraction. A problem exists when a large number of people want to go to one attraction versus another. If the manager of the park could somehow create a virtual queue such that they could define a "slot" that in turn defines a time at which a particular visitor to the park could visit that attraction in order to jump into the middle of the queue, that would be desirable. By creating a virtual queue, that is possible. This will both reduce the amount of time waiting in the actual queue and thus increasing the amount of time that the visitor may spend at various vendor sites associated with bars, restaurants and the such.

In order to facilitate the virtual queue with the system of the present disclosure, an interface must be made between the central unit 102 and the mobile units 112. The first interface is a broadcast interface that defines the number of attractions in the parks. Each of the attractions is provided an ID, a name and a position. A second broadcast package will be provided that will give detail on each attraction, such as the open and close hours, the current waiting time, etc. This is a real-time broadcast that must be kept up to data in order to provide vital information to a visitor. Third, an interactive session must be provided between the visitor with their mobile unit 112 and the central unit 102. The central unit 102 will then communicate with the vendor or attraction management. This requires a request message from the mobile unit 112 to be sent to the central unit 102 requesting a position in the queue for a particular attraction and a response then provided back to the mobile unit 112 in order to book the visitor of the time slot for the virtual queue. Thus, the visitor can book a reservation, cancel a reservation and request status of the reservation. Once the request has been sent out to the central unit 102, then an acknowledgment will be provided from the central unit confirming the slot in the queue.

Figure 28:
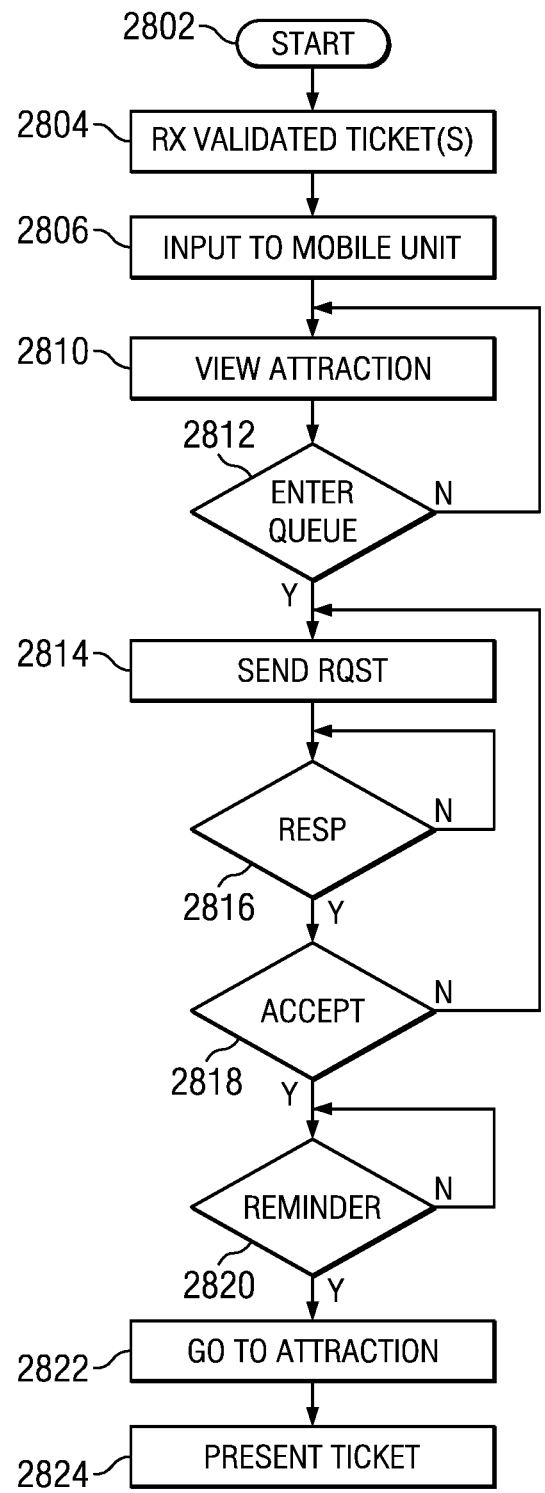
FIG. 28 illustrates a flow chart depicting the virtual queue operation.

Referring now to FIG. 28, there is illustrated a flow chart depicting the virtual queue operation. The application is initiated at a block 2802 and then proceeds to a function block 2804 in order to indicate the operation wherein a visitor to the park will purchase a validated ticket upon entering the theme park. Each user will be given a ticket with a validated number. This ticket allows the user access to all attractions within the park. Of course, sometimes different tickets will be provided for different levels of access. Once the ticket is received, the visitor, being in possession of a mobile unit 112, has the option to launch their application on the mobile unit 112. Once the application is launched, it will seek to access the base stations 106 associated with that theme park. Typically, a theme park will have its own set of base stations 106 and, as such, its own network ID. Therefore, the application will be unique to that network ID. Once launched, the user will be prompted to input their ticket or possibly multiple tickets associated with different family members. All of these validation numbers can be input to the system. This is indicated at a function block 2806. The program then flows to a function block 2810 wherein the visitor can review the various attractions that have been downloaded as a result of the application running on the visitor's mobile unit. Each of these attractions will have the title of the attraction and various real-time status information associated with that attraction, such as whether it is active or inactive, the opening time and closing time and the waiting time. The user can decide whether they want to select a time slot to enter the queue, i.e., if they want to go to the attraction, they would like to know when they can go and be placed into a short queue. This is a decision made at block 2812. Once the user has selected the queue, i.e., the user has checked a box, selected how many people they want to be in the queue, etc. A request is then sent out to the central unit 102 via the base station 106, as indicated by a block 2814. This request is handled by the central unit 102, which as described herein above, requires the base station 106 to send back an acknowledgement signal indicating that the request was received followed by the transmission of a response from the central unit 102 a finite time later in the broadcast stream. This is indicated at a decision block 2816 wherein a response is determined to have been received. Once the response has been received, this will inform the user as to when the user can visit the attraction. The user then has the option to positively accept the time slot at the attraction and, if not, another request will be sent out. The central unit 102 has to have the intelligence to recognize that it must lengthen the time, i.e., place them into a later slot. This is decided at decision block 2818. The program, after accepting, then flows to a decision block 2820 wherein a reminder sent to the mobile unit 112 at a later time, i.e., this reminder could merely remind the user of a certain proximity in time to their designated queue time. The program then flows to a function block 2822 wherein the user goes to the attraction and then to a function block 2824 where the user presents their ticket to the person running the attraction, which ticket is then scanned to indicate that they are in the valid group for that particular queue. Typically, they will have possibly two lines, one for the virtual queue and one for the "walk ups" such that a more expedited handling of the traffic can be accommodated in the virtual queue versus the non virtual queue. When they are accepted into the virtual queue group, i.e., they showed up at the specified time, then they will be allowed to enter that queue. This will significantly reduce the amount of time that the individual has to sit in the queue. Additionally, the central unit 102 can inform the user as to any delays that may occur for mechanical problems and the such. If the user decides that the delay is too much or if they decide that their original queue slot would be missed, they have the option of canceling that scheduled slot.

Figures 29, 29A, 30, 31:
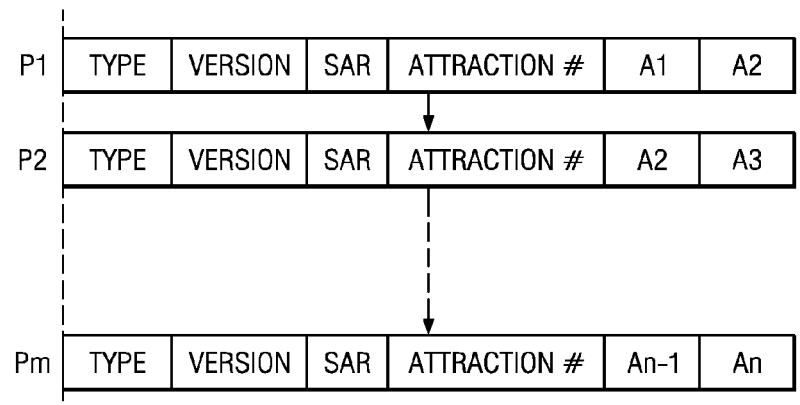
FIG. 29 illustrates a display for the virtual queue on the mobile unit.
FIG. 29a illustrates the packet format for transferring information regarding attractions in the virtual queue.
FIG. 30 illustrates the packet format for the transmission from the central unit regarding the status and wait time for an attraction.
FIG. 31 illustrates the packet format for the request from the mobile unit in the virtual queue applications.

Referring now to FIG. 29, there is illustrated a diagrammatic view of the display associated with an example of the virtual queue that would be provided to the user. Initially, the user, after launching the application, would be provided with a populated table displaying all of the attractions. They would define such things as the name of the attraction, A1, A2, A3, A4, for example, followed by the status of that attraction, active or inactive, the delay in the queue for walk ups, a box for a scheduled delay if such were scheduled for a user, the number of persons if scheduled and also the number of the group number in which they are scheduled. On the far right would be a column that would show a box for selecting the attraction. If the user desired to place themselves into a queue, they would select that box that would automatically send a request. Upon the request being confirmed, i.e., a slot being assigned by the attraction via the central unit 102, then this box would change its status to be filled in. In order for all of this to be facilitated, the manager of each attraction would have to be connected to the central unit 102 in order to receive in real-time the information from the user and to provide information thereto.

The first packet is illustrated in FIG. 29*a*. This packet will contain fields associated with a number of attractions after the type, the version and SAR fields. The attraction number will define how many attractions there are. This will require segmentation if there are a number of attractions. There are illustrated a plurality of packets which go all the way up to attraction An from A1. Each of the attraction fields will have associated therewith an attraction ID, the alpha-numeric name of the attraction and geolocation information in the form of the latitude and longitude. Since the geolocation of the packet is a fixed parameter that needs only be stored in the receiver once, there need be no dynamic information associated therewith. This can be utilized for interfacing with a map of a theme park, for example, to show where the attraction is. It may be that one field is the location on the display which could be selected to jump to a map of the theme park to show where the attraction is. The ID of the attraction is utilized to relate a particular selection to the user ID for creating the interactive communication between the mobile unit 112 and the central unit 102. In general, the version number will be maintained because the architecture of the park seldom changes after it is construed. Since the version doesn't change, new packets that are being constantly downloaded for new mobile units entering the system will be discarded by the system that has been constructed.

The attraction detail is a broadcast packet that is illustrated in FIG. 30. This is a dynamic packet that provides such things as the attraction status, whether it is open, closed, unavailable, etc. and also the virtual queue size in minutes, i.e., the waiting time. This is a relatively short packet and will probably not require segmentation. However, the version of this packet may change each minute—a first priority packet. In order to avoid confusion, the version will be coded on 2 bytes so as to have a unique version per day. The reception of this packet provides relevant information regarding the time that a particular visitor can wander around the park. To avoid this byte having the wrong information, the mobile unit 112 will manage the display to ensure that it has been updated. If a new version of the packet has not been received within 5 minutes, there is a timer on the mobile unit 112 that will cause a display to change to indicate to the user that the display information is incorrect. Thus, there is a requirement that a new packet be received at least once every 5 minutes for the attraction. Thus, at least once every 5 minutes, the manager of the attraction must output an update of the status information to the central unit 102 which will then place this into the database for transmission out to all of the mobile units 112. Each time a new version is received, it will be accepted by the MAC and the timer will be reset. (This is also required for the tables application described hereinabove.) By knowing the ID, the status information and waiting time information can be placed in the appropriate location in the display.

FIG. 31 illustrates the request packet which is a PTP packet. The information that is carried in this packet is the sender ID which is the source address of the packet, i.e., the ID of the mobile unit 112, the attraction ID that is selected, a demand type which is the information regarding a booking request, a cancel request, a status request and other requests that may be associated therewith. A field is provided for the number of people that are to be associated with the request and the ID for each person associated therewith. This is basically the ticket ID that was given to the visitor when they entered the park for all of the associated people. Upon reception of this demand, the central unit 102 will send a response packet as described herein above. This response packet will provide an indication to the user as to whether they were accepted and what time they are allowed to come.

Referring now to FIG. 32, there is illustrated the packet format for the response packet from the central unit 102. This can be utilized to indicate to the user that they have been accepted and what time slot they are in, it can be provided to update the user's information in the event that an earlier time is available or there is a delay or just to provide a reminder to the user, i.e., that their slot is only two minutes away or the such. Information that is disposed in the packet is the sender ID, the destination address of the packet, the attraction ID, the group number which is the number associated with the particular group queue that the users are disposed in, the time of the group slot, i.e., the date and the time of the day, the number of people associated with that queue and the ID for each of the people.

Referring now to FIG. 33, there is illustrated a diagrammatic view of the mobile unit 112. The mobile unit 112 in this embodiment is comprised of a cell phone or PDA. The PDA has associated therewith a display 3302 and an input keyboard 3304. This display 3302 could be a touch screen display to allow the user to interface therewith. In the disclosed embodiment, there are provided multiple radios on the PDA. This is conventional. Typically, most PDAs have multiple bands such as CDMA and GSM capabilities. They also provide for a WiFi access an also for Bluetooth access to interface with such things as headsets. There is an additional radio provided having an antenna 3306 associated therewith. This provides the modified 802.15.4 communication capability. This is a separate broadcast channel. However, it should be understood that this standard is only utilized in this example. Any radio that is capable of broadcasting and functioning in the manner described herein above with multiple channels and the such could be utilized. Even if the system were in a broadcast mode, the separate broadcast could be utilized. The disclosed embodiment utilizes a separate radio that can be either integrated into the phone when the phone is manufactured, made a part of an SD card that can be inserted in an SD slot or it can be connected via an external connector, such as a USB connector wherein the radio would be disposed on a USB dongle. The diagrammatic structure of this is illustrated in FIG. 34 wherein there is provided a central CPU 3402 with an I/O 3404 and a display 3408. There is provided the cell phone aspect 3410 which allows the mobile unit 112 to interface with the internet and various telecommunication systems. There is also provided a radio 3412 which provides the communication aspects for the system as described herein to communicate with the base station 106.

In another application, a museum may be provided with base stations 106 in one or more rooms of the museum that transmit text and picture information for individual exhibits for the entire museum. In a particular embodiment, information in different languages may be transmitted on different channels. A visitor may download a simple application to his or her mobile unit 112 that includes a map of the museum including all rooms. Each base station 106 may transmit localization information, or alternately, each room may include a geolocation marker 116 that transmits localization information, which will be used by the mobile unit 112 to place a point on the map. The user of the mobile unit 112 can then zoom in one the room and have access to all of the detail on artists and exhibits in the room. By not including the detailed information in the application itself, the museum may rearrange exhibits and add and remove temporary exhibits within the museum without requiring creation of and downloading of a new version of the application.

In another application, an airport may be provided with base stations 106 and geolocation markers 116. This may be used to provide information to users of mobile units 112 which they are located within the airport. The information provided may include departure time-tables and gates, arrival time-tables and gates, expected transit time at security, real-time information updates, airport terminal maps and geolocation services, ground transportation information, advertising for duty-free shops, advertising for luxury brands, etc. An advantage of this application is that geolocation services can be provided within the airport even if a GPS signal cannot be received by the mobile unit 112 while indoors.

In still another application, a shopping mall may be provided with base stations 106 and geolocation markers 116 to provide information to users of mobile units 112 such as maps of the shopping mall, children geolocation and monitoring, a shopping search engine, advertisements for brands or shops, etc.

It will be appreciated by those skilled in the art having the benefit of this disclosure that this urban mobile network system provides a low bandwidth system and method for providing information such as localized information to a number of mobile units in a particular area. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A mobile network system comprising:
   a central unit having:
      a database having stored therein a data structure; and
      a central unit communications transceiver for communicating with a first network;
   at least one intermediate base station having:
      a base station transceiver for communication with the central unit over the first network; and
      a mobile transmitter for transmitting data to a second network in a broadcast mode for receipt by a receiving unit and not requiring any back communication link to a receiving unit;
   a plurality of mobile units each operating as a receiving unit, each having:
      a mobile receiver for receiving the broadcast data from the base station over the second network, such that all of the plurality of mobile units receive the broadcast data at substantially the same time; and
      a memory for storing the data;
   wherein the central unit operates in a broadcast mode to map at least one portion of the data structure to the memory in each of the mobile units through the intermediate base station such that the portion of the data structure is received by substantially all of the mobile units at the same time.

2. The mobile network system of claim 1, wherein each of the plurality of mobile units further includes:
   a display; and
   a processor for running an application to display at least a portion of stored data.

3. The mobile network system of claim 2, further comprising:
   a geolocation marker external to the mobile unit for generating a signal including position information indicating a relative position, which the signal is received by the mobile unit when the mobile unit is proximate to the geolocation marker, the application running on the processor utilizing the relative position during the operation thereof.

4. The mobile network system of claim 3, wherein a plurality of geolocation markers are provided and the application is operable in at least two modes, one mode associated with a first geolocation marker and a second mode associated with a second geolocation marker, wherein proximity to the first or second geolocation marker determines the mode.

5. The mobile network of claim 3, wherein the application is operable to display a portion of the stored data associated with the relative position.

6. The mobile network of claim 3, wherein the application is operable to display a position associated with the relative position on a map.

7. The mobile network system of claim 3, wherein the position information includes a latitude and longitude associated with the geolocation marker.

8. The mobile network system of claim 3, wherein the position information includes a location name associated with the geolocation marker.

9. The mobile network system of claim 3, wherein the mobile transmitter of the intermediate base station is operable to transmit in a broadcast only mode a synchronization signal, thus requiring no communication back to the base station, and wherein the geolocation marker is operable to receive the synchronization signal and transmit in a broadcast only mode the signal for receipt by receiving ones of the plurality of mobile units indicating the relative position in response thereto.

10. The mobile network system of claim 1, wherein the first network comprises the internet.

11. The mobile network system of claim 1, wherein the memory of the intermediate base station includes a temporary storage for storing the at least one portion of the data structure therein.

12. The mobile network system of claim 1, wherein the intermediate base station is operable to continuously transmit in a broadcast mode requiring no response from the receiving one or ones of the plurality of mobile units the portion of the data structure stored within the memory thereof to the plurality of mobile units.

13. The mobile network system of claim 1, wherein one of the plurality of mobile units is operable to transmit a request message to the central unit via the at least one intermediate base station independent of the broadcast operation of the base station, and receive a response message from the central unit via the at least one intermediate base station in response thereto.

14. The mobile network system of claim 1, wherein the central unit is operable to map a first portion of the data structure to the memory of a first mobile unit through a first intermediate base station, and map a second portion of the data structure to the memory of a second mobile unit through a second intermediate base station.

* * * * *